(12) United States Patent
Alvarez-Icaza et al.

(10) Patent No.: US 9,932,087 B2
(45) Date of Patent: Apr. 3, 2018

(54) VEHICLE DRIVABLE IN USE BY A PERSON WALKING OR RUNNING WHILST SEATED AND THE USE OF SUCH VEHICLE

(71) Applicant: Velofeet Ltd, Inverness Highland (GB)

(72) Inventors: Manuel Alvarez-Icaza, Inverness Highland (GB); Veronica Vargas, Inverness Highland (GB)

(73) Assignee: VELOFEET LTD, Inverness (GB)

( * ) Notice: Subject to any disclaimer, the term of this patent is extended or adjusted under 35 U.S.C. 154(b) by 0 days.

(21) Appl. No.: 14/898,449

(22) PCT Filed: May 30, 2014

(86) PCT No.: PCT/GB2014/051658
§ 371 (c)(1),
(2) Date: Dec. 14, 2015

(87) PCT Pub. No.: WO2015/001297
PCT Pub. Date: Jan. 8, 2015

(65) Prior Publication Data
US 2016/0137258 A1    May 19, 2016

(30) Foreign Application Priority Data

Jul. 4, 2013 (GB) .................................. 1312012.6

(51) Int. Cl.
*B62K 1/00* (2006.01)
*B62M 1/00* (2010.01)
(Continued)

(52) U.S. Cl.
CPC .................. *B62M 1/00* (2013.01); *B62J 1/00* (2013.01); *B62J 1/08* (2013.01); *B62K 3/00* (2013.01);
(Continued)

(58) Field of Classification Search
CPC ...... B62K 1/00; B62K 3/007; B62K 2207/02; B62K 2207/04
(Continued)

(56) References Cited

U.S. PATENT DOCUMENTS 87,355 A    3/1869  Myers
246,031 A   8/1881  Otto
(Continued)

FOREIGN PATENT DOCUMENTS

CN    2466023 Y    12/2001
CN    2860988 Y     1/2007
(Continued)

OTHER PUBLICATIONS

Sbyke http://sbyke.com/ Oct. 12, 2015.
(Continued)

*Primary Examiner* — Joseph M Rocca
*Assistant Examiner* — Conan D Duda
(74) *Attorney, Agent, or Firm* — Moore & Van Allen PLLC; W. Kevin Ransom

(57) ABSTRACT

The invention provides a vehicle drivable in use by a person walking or running while seated comprising: a frame; a large diameter front wheel non-steerable with respect to the frame, a seat for supporting a user's weight while walking or running, the frame configured to carry the seat suspended on the front wheel, a small diameter, steerable rear wheel journalled to the frame at a steering pivot axis, the seat being rotatable forwardly with respect to the front wheel and comprising a seat base for supporting a user and further comprising a backrest for engaging the user's back in use. The large front wheel may be of approximate diameter of a user's leg (typically an adult human), thus the large front wheel may be of similar size to a bicycle wheel for the user.

18 Claims, 12 Drawing Sheets

- Increased (positive) caster angle
- Increased positive mechanical trail

(51) Int. Cl.
| | |
|---|---|
| *B62M 29/00* | (2006.01) |
| *B62J 1/08* | (2006.01) |
| *B62J 1/00* | (2006.01) |
| *B62K 3/00* | (2006.01) |
| *B62K 17/00* | (2006.01) |
| *B62K 21/00* | (2006.01) |
| *B62K 3/16* | (2006.01) |

(52) U.S. Cl.
CPC .............. *B62K 17/00* (2013.01); *B62K 21/00* (2013.01); *B62M 29/00* (2013.01); *B62K 1/00* (2013.01); *B62K 3/16* (2013.01); *B62K 2700/56* (2013.01)

(58) Field of Classification Search
USPC ........................................................ 280/264
See application file for complete search history.

(56) References Cited

U.S. PATENT DOCUMENTS

| | | | |
|---|---|---|---|
| 2,330,147 A | 9/1943 | Rodriguez | |
| 3,282,606 A | 11/1966 | Casner | |
| 3,392,991 A | 7/1968 | Ryan et al. | |
| 3,437,351 A | 4/1969 | Newbern | |
| 3,442,528 A | 5/1969 | Rademacher | |
| 3,504,934 A | 4/1970 | Wallis | |
| 3,605,929 A * | 9/1971 | Rolland | B62D 61/08 |
| | | | 180/208 |
| 3,620,547 A | 11/1971 | Vaverek | |
| 3,860,264 A | 1/1975 | Douglas et al. | |
| 4,113,393 A * | 9/1978 | Kiefer | G01B 11/2755 |
| | | | 356/155 |
| 4,144,617 A * | 3/1979 | McCarroll | B60B 33/0052 |
| | | | 16/18 A |
| 4,239,248 A | 12/1980 | Ewers | |
| 4,272,095 A * | 6/1981 | Ptaszek | B62K 9/00 |
| | | | 280/220 |
| 4,324,413 A * | 4/1982 | Bensette | B62K 1/00 |
| | | | 180/21 |
| 4,359,231 A | 11/1982 | Mulcahy | |
| 4,657,272 A | 4/1987 | Davenport | |
| 4,845,805 A * | 7/1989 | Kassai | B60B 33/02 |
| | | | 16/35 R |
| 5,330,221 A | 7/1994 | Sutton | |
| 5,509,831 A | 4/1996 | Gelbart et al. | |
| 5,620,189 A | 4/1997 | Hinderhofer et al. | |
| 6,250,656 B1 | 6/2001 | Ibarra | |
| 6,367,817 B1 | 4/2002 | Kamen et al. | |
| 6,561,294 B1 * | 5/2003 | Kamen | B62D 37/00 |
| | | | 180/21 |
| 7,004,271 B1 | 2/2006 | Kamen et al. | |
| 7,537,229 B1 | 5/2009 | Wu | |
| D641,667 S | 7/2011 | Ryan et al. | |
| D660,932 S | 5/2012 | Wilson | |
| 8,800,697 B2 * | 8/2014 | Hoffmann | B60T 7/042 |
| | | | 180/21 |
| 9,027,678 B1 * | 5/2015 | Morris | A61G 5/04 |
| | | | 180/22 |
| 9,085,334 B2 * | 7/2015 | Hoffmann | B62K 3/007 |
| D739,307 S * | 9/2015 | Hoffmann | B60W 20/00 |
| | | | D12/107 |
| 9,188,984 B2 * | 11/2015 | Kamen | A63C 17/01 |
| 2002/0047245 A1 | 4/2002 | Greene | |
| 2002/0070519 A1 | 6/2002 | Rappaport | |
| 2003/0042701 A1 | 3/2003 | Chen et al. | |
| 2005/0028319 A1 * | 2/2005 | Schreiber | A61G 5/10 |
| | | | 16/28 |
| 2006/0038372 A1 | 2/2006 | Goczey et al. | |
| 2006/0131830 A1 * | 6/2006 | Berg | B62H 1/12 |
| | | | 280/205 |
| 2006/0279057 A1 * | 12/2006 | Shimizu | B62K 1/00 |
| | | | 280/205 |
| 2007/0158117 A1 | 7/2007 | Alexander | |
| 2007/0257451 A1 | 11/2007 | Furuta et al. | |
| 2008/0054596 A1 * | 3/2008 | Johanson | A61G 5/06 |
| | | | 280/304.1 |
| 2008/0143073 A1 | 6/2008 | Ungar et al. | |
| 2008/0217085 A1 | 9/2008 | Wernli | |
| 2010/0181124 A1 * | 7/2010 | Wang | A61G 5/045 |
| | | | 180/65.1 |
| 2010/0198493 A1 | 8/2010 | Furuta et al. | |
| 2010/0225088 A1 | 9/2010 | Wernli | |
| 2010/0327547 A1 | 12/2010 | Wilson et al. | |
| 2011/0006497 A1 * | 1/2011 | Chen | A63C 17/0033 |
| | | | 280/87.042 |
| 2011/0067940 A1 * | 3/2011 | Takenaka | B62K 1/00 |
| | | | 180/218 |
| 2011/0166713 A1 * | 7/2011 | Tsuji | B62K 1/00 |
| | | | 700/279 |
| 2011/0175319 A1 | 7/2011 | Chen | |
| 2011/0238247 A1 * | 9/2011 | Yen | B62H 1/12 |
| | | | 701/22 |
| 2011/0304117 A1 * | 12/2011 | Aloni | B62H 7/00 |
| | | | 280/211 |
| 2012/0018232 A1 * | 1/2012 | Uehara | B60B 19/003 |
| | | | 180/7.1 |
| 2012/0032496 A1 * | 2/2012 | Takenaka | B60B 19/003 |
| | | | 301/5.23 |
| 2012/0158255 A1 * | 6/2012 | Takenaka | B60B 3/048 |
| | | | 701/49 |
| 2012/0166056 A1 * | 6/2012 | Akimoto | B60B 3/048 |
| | | | 701/93 |
| 2012/0168236 A1 * | 7/2012 | Hamaya | B62K 1/00 |
| | | | 180/21 |
| 2012/0173041 A1 * | 7/2012 | Takenaka | B62J 1/005 |
| | | | 701/1 |
| 2012/0173088 A1 * | 7/2012 | Kobashi | B60B 3/048 |
| | | | 701/49 |
| 2012/0173109 A1 * | 7/2012 | Akimoto | B62K 1/00 |
| | | | 701/70 |
| 2012/0175175 A1 * | 7/2012 | Gomi | B62J 1/005 |
| | | | 180/21 |
| 2012/0175176 A1 * | 7/2012 | Hamaya | B62J 1/005 |
| | | | 180/21 |
| 2012/0179352 A1 * | 7/2012 | Takenaka | B62J 1/00 |
| | | | 701/99 |
| 2013/0056288 A1 * | 3/2013 | Gano | B60G 3/01 |
| | | | 180/23 |
| 2013/0133960 A1 * | 5/2013 | Yada | B60B 19/12 |
| | | | 180/21 |
| 2013/0299260 A1 * | 11/2013 | Shimizu | B62K 3/007 |
| | | | 180/220 |
| 2013/0299261 A1 * | 11/2013 | Muto | B62K 3/007 |
| | | | 180/220 |
| 2013/0299262 A1 * | 11/2013 | Muto | B62K 3/007 |
| | | | 180/220 |
| 2013/0299263 A1 * | 11/2013 | Shimizu | B62K 1/00 |
| | | | 180/220 |
| 2013/0299264 A1 * | 11/2013 | Araki | B62K 3/007 |
| | | | 180/220 |
| 2013/0304290 A1 * | 11/2013 | Araki | B60B 19/003 |
| | | | 701/22 |
| 2013/0304316 A1 * | 11/2013 | Takenaka | B62K 1/00 |
| | | | 701/36 |
| 2013/0304320 A1 * | 11/2013 | Takenaka | B60B 19/003 |
| | | | 701/41 |
| 2013/0304323 A1 * | 11/2013 | Takenaka | B62D 11/003 |
| | | | 701/42 |
| 2014/0067177 A1 * | 3/2014 | Kobashi | B62K 3/007 |
| | | | 701/22 |
| 2014/0251708 A1 * | 9/2014 | Yeh | B62K 1/00 |
| | | | 180/206.3 |
| 2014/0297127 A1 * | 10/2014 | Araki | G05D 1/0268 |
| | | | 701/41 |
| 2014/0353051 A1 * | 12/2014 | Yada | B62K 3/007 |
| | | | 180/6.2 |
| 2014/0353052 A1 * | 12/2014 | Muto | B60K 1/02 |
| | | | 180/6.5 |

(56) References Cited

U.S. PATENT DOCUMENTS

| | | | | |
|---|---|---|---|---|
| 2014/0353941 | A1* | 12/2014 | Muto | B62K 3/007 280/301 |
| 2015/0028550 | A1* | 1/2015 | Gano | B62D 7/026 280/5.51 |
| 2015/0123367 | A1* | 5/2015 | Gano | B60G 3/02 280/86.751 |
| 2015/0129326 | A1* | 5/2015 | Ozaki | B62K 3/007 180/6.2 |
| 2015/0129327 | A1* | 5/2015 | Yoshino | B60B 19/003 180/6.5 |
| 2015/0174977 | A1* | 6/2015 | Shahroodi | B60D 1/665 280/476.1 |
| 2015/0175233 | A1* | 6/2015 | Ungar | B62L 3/02 180/181 |
| 2015/0251563 | A1* | 9/2015 | Shirokura | B60L 15/20 701/22 |

FOREIGN PATENT DOCUMENTS

| | | |
|---|---|---|
| DE | 3506026 A1 | 8/1986 |
| DE | 3620378 A1 | 12/1987 |
| DE | 3506026 C2 | 4/1990 |
| DE | 19547050 A1 | 6/1997 |
| EP | 0026800 A1 | 3/1979 |
| EP | 638475 A1 | 9/1997 |
| EP | 638475 B1 | 9/1997 |
| EP | 945334 A2 | 9/1999 |
| EP | 945334 A3 | 9/2000 |
| FR | 1513176 A | 2/1968 |
| FR | 2776980 A1 | 10/1999 |
| FR | 2776980 B3 | 10/2000 |
| JP | 2001095865 A | 4/2001 |
| JP | 2001130204 A * | 5/2001 |
| JP | 2011063182 A | 3/2011 |
| JP | 2011063240 A | 3/2011 |
| WO | 8908043 A1 | 9/1989 |

OTHER PUBLICATIONS

Bergmonch—Hiking uphill—Wheeling down! http://www.bergmoench.com/De/ Dec. 1, 2014.
Magic Wheel! The new kid on the block. The latest foot scooter! It's a Magic Wheel! http://magicwheelusa.com/ Oct. 12, 2015.
Halfbike http://halfbikes.com/halfbike2 Jan. 29, 2016.
YikeBike model C specifications and materials http://www.yikebike.com/model-c/ Aug. 2, 2016.
A short history of bicycling (p. 22-23) MIT Press.
International Preliminary Examination Report for International Application No. PCT/GB2014/051658 dated Jan. 5, 2016; 11 pages.

\* cited by examiner

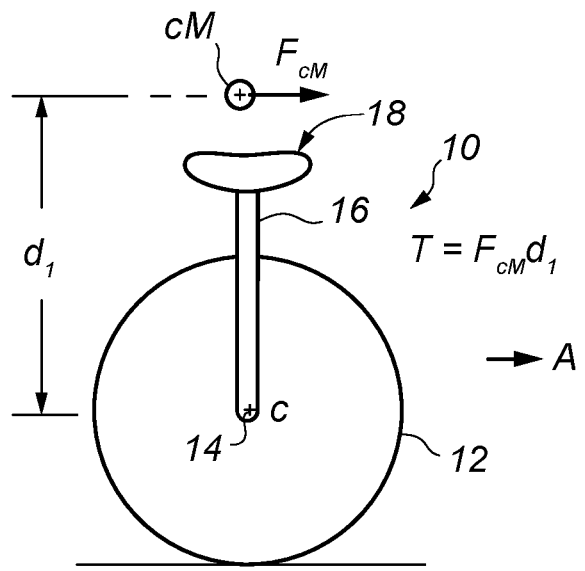
Fig. 1
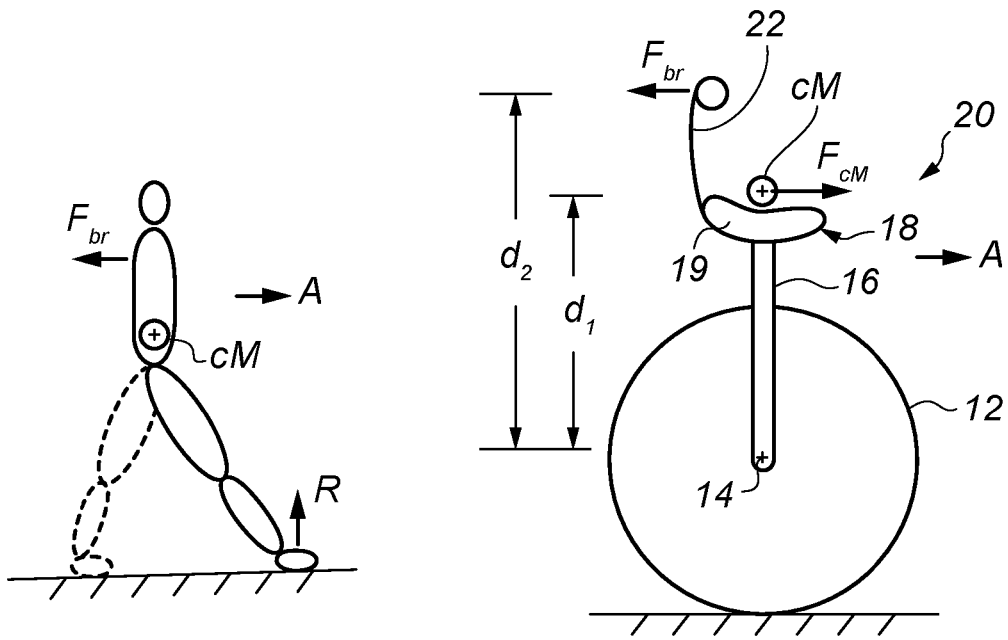
Fig. 2
Fig. 3

- Zero caster angle
- Positive mechanical trail

- Zero caster angle
- Positive mechanical trail, x

- Increased (negative) caster angle, β
- Decreased mechanical trail, x

- Zero caster angle
- Positive mechanical trail

- Centre of mass
- × Wheel contact point
- ⊙ Rotation axis

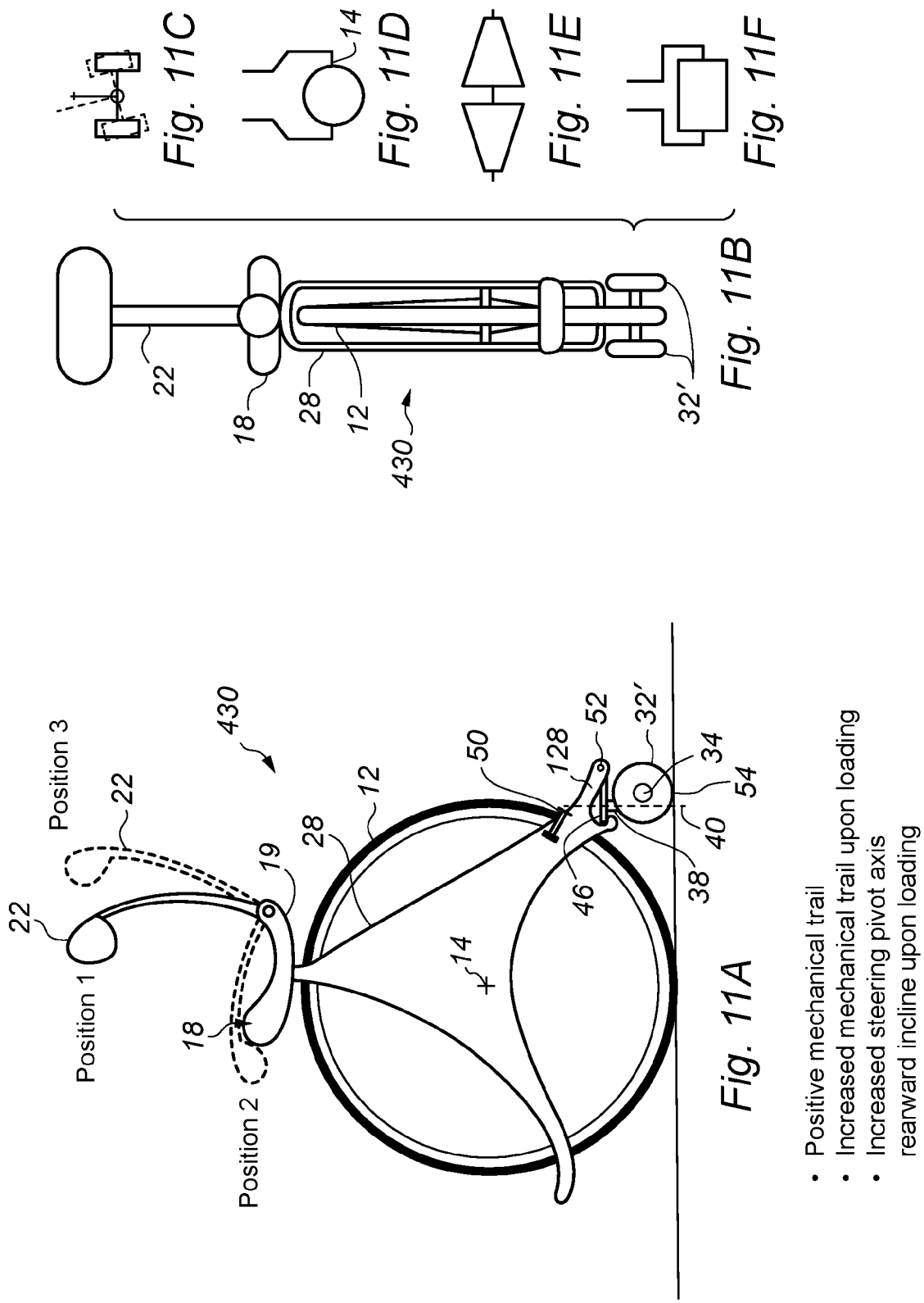

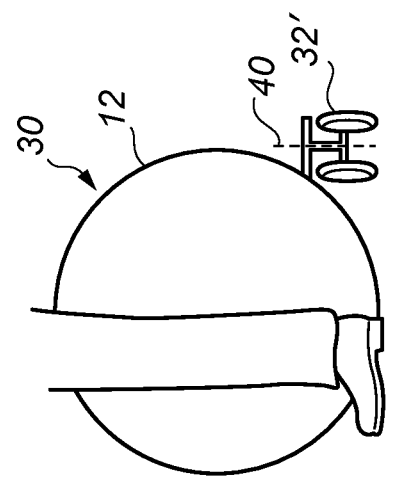
Fig. 13A Top view
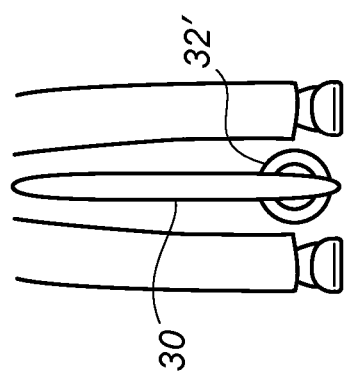
Fig. 13B Front view
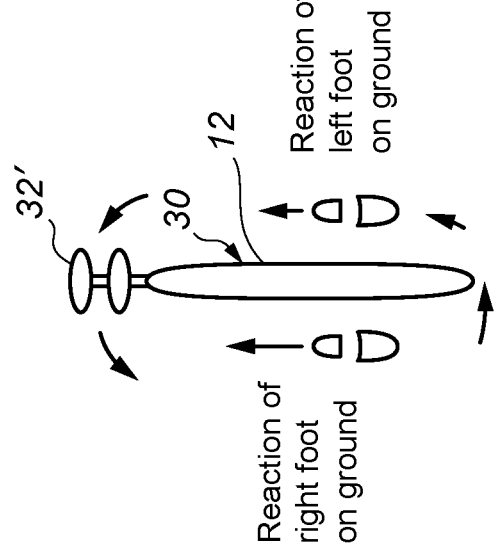
Fig. 13C Side view

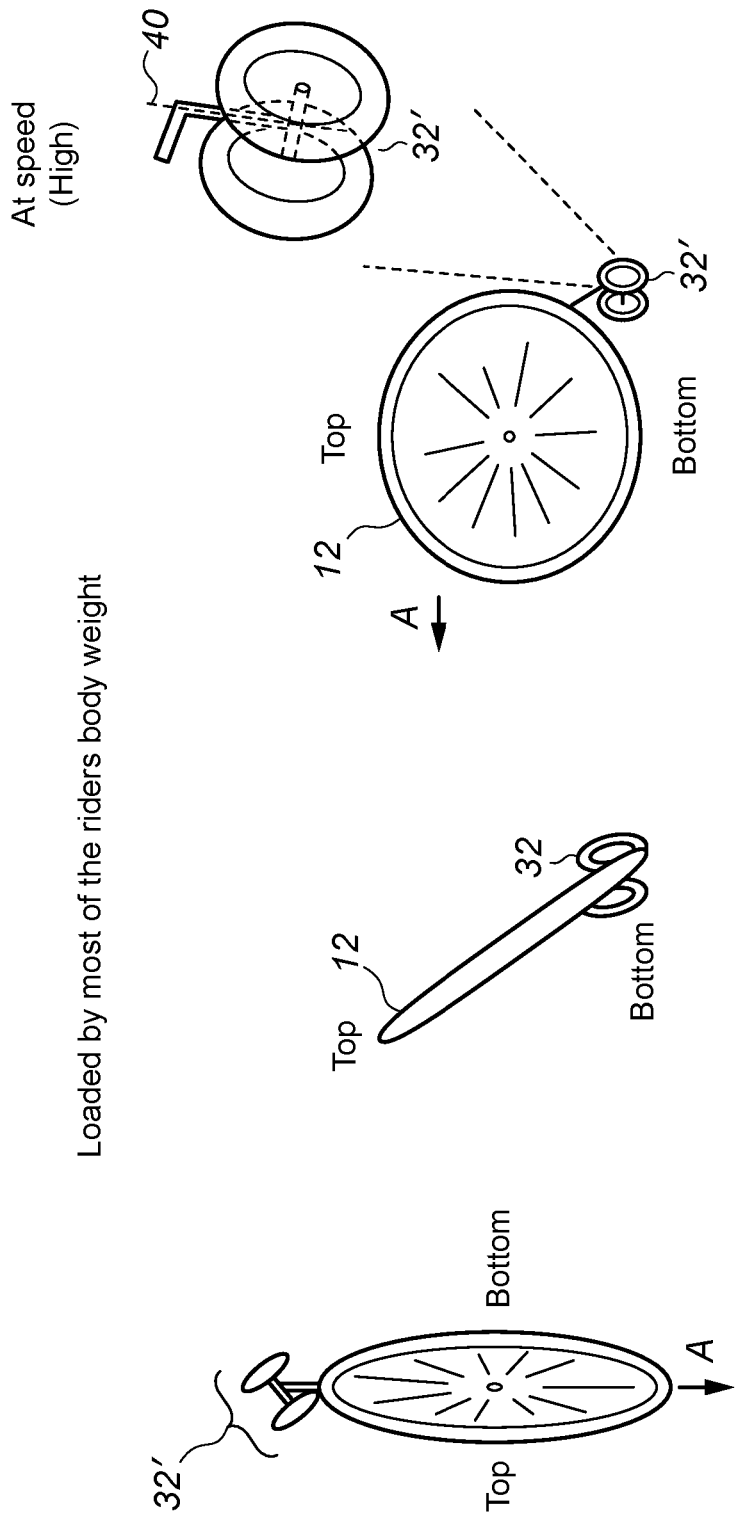

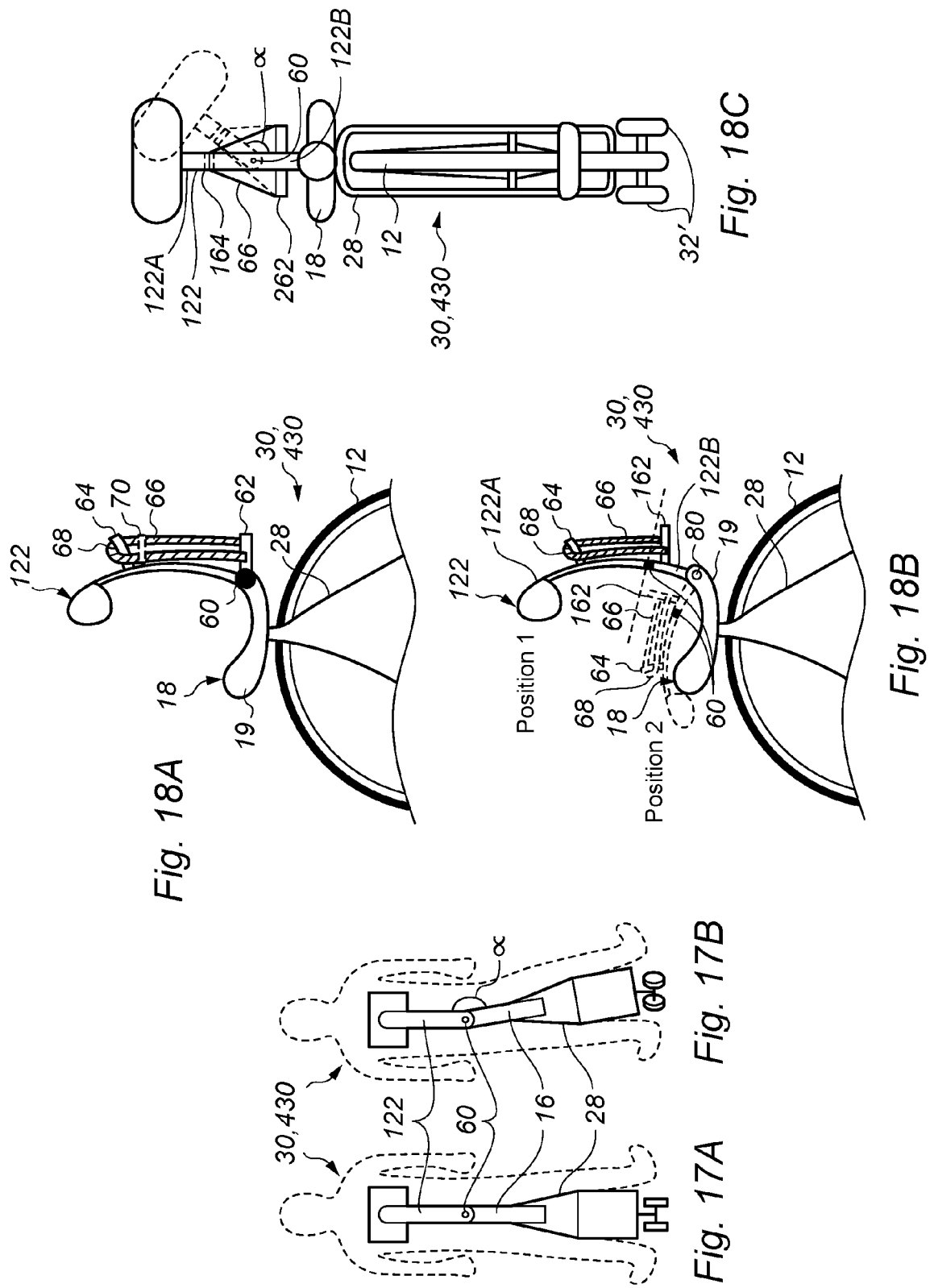

VEHICLE DRIVABLE IN USE BY A PERSON WALKING OR RUNNING WHILST SEATED AND THE USE OF SUCH VEHICLE

CROSS-REFERENCE TO RELATED APPLICATIONS

This application is a national stage application (filed under 35 § U.S.C. 371) of PCT/GB2014/051658, filed May 30, 2014 of the same title, which, in turn, claims priority to Great Britain Application No. 1312012.6, filed Jul. 4, 2013 of the same title; the contents of each of which are hereby incorporated by reference.

The invention relates to a vehicle, drivable by a person walking or running, and in particular a vehicle for carrying a person and drivable by the person walking or running.

BACKGROUND

Solutions to commuting have been proposed to allow access to the congested parts of cities using public transport, including use of a motor car to the edge of the restricted zone, and then use of an un-motorized vehicle to move into the congested zone (e.g. of a city).

For using public transport, there is a need for transport from the point of starting the journey to a point of connection with the public transport. That is, two short distance transport problems, known in academic literature as the first and last mile; these are a big barrier to the integration of public transport into a user's daily routine.

It would be very convenient to have a simple vehicle that minimises space, weight and also makes the best use of human propulsion and the fact that floor surfaces in cities are mainly smooth and adapted to wheeled transport. Various vehicles have been proposed either to address this problem or as hobby or sports devices.

U.S. Pat. No. 3,392,991 RYAN describes a unicycle with a self-steering arrangement comprising a pair of wheels on a pivot pin journalled on the vehicle frame on an oblique angle. FR2776980 MASQUELIER describes an improved monocycle having a castor providing a second point of ground support in the rear of the monocycle. U.S. Pat. No. D641,667 RYAN shows a motorised two wheeled bicycle comprising a larger front wheel and a smaller rear wheel, with a seat for the user and handle bars attached to the seat. JP2011063240 and JP2011063182 TAKENAKA describe an inversion pendulum type vehicle. CN2860988 ZHANG describes an electric unicycle. U.S. Pat. No. 7,004,271 KAMEN describes a dynamic balancing vehicle with a seat. U.S. Pat. No. 6,367,817 KAMEN describes a device comprising a platform supporting a payload and a motorised drive arrangement and a user input control to control the device. US20100198493 and US20070257451 FURUTA describe a car having a leg for walking. FR1513176 MUNIER describes a single wheeled cycle with stabilisers. DE3506026 MAUERHOFF describes a vehicle with a frame in the form of a three legged stand and rolling or sliding elements. US2011175319 CHEN describes a powered unicycle with a steerable wheel. U.S. Pat. No. 3,282,606 CASNER describes an operator propelled cycle with a pair of trailing wheels. US2007/0158117 ALEXANDER describes a powered unicycle comprising a single wheel driven by a motor, with a handle bar coupled to the wheel by a pillar.

EP638475 HINDERHOFER describes a *scooter with a steerable front wheel. U.S. Pat. No. 3,620,547 VARVEREK describes a scooter with a rear wheel which turns automatically upon tilting of the scooter frame. US2008/0217085 WERNLI and US2010/0225088 describe a three wheeled scooter, comprising a longitudinal chassis, a larger front wheel non-pivotally mounted to a frame and a pair of rear mounted yawable smaller wheels to allow steering. US2008/0143073 UNGAR describes a foot propelled wheeled hobby or support device for propelling whilst standing on with a large wheel, two side plates attached to the axle, foot rests and a satellite wheel. US2006/0038372 GOCZEY describes a hobby or sports device comprising a single wheel between two side plates attached to the axle in the form of a yoke, with foot rests extending out from the side plates and handle bars for the user to grip rising from the yoke. U.S. Pat. No. 6,250,656 IBARRA describes a steerable toy comprising a skate board bicycle combination with an elongated footboard and a pair of wheels attached to the rear. U.S. Pat. No. 5,620,189 HINDERHOFER describes a scooter comprising a large front wheel, a footboard and a steering yoke attached to the front wheel. US2002/007051 RAPPAPORT describes a dual footboard scooter comprising a front wheel or ski coupled to a steering post and a rigid tricycle format frame having a bifurcated format, rearward extensions, which support a rear wheel or ski each.

US20020047245 GREENE describes a three wheeled vehicle having a pair of rear wheels and a kingpin axis spaced by a trail dimension from the rear axle axis. U.S. Pat. No. 3,504,934 WALLIS describes a tricycle with a pair of rear wheels and a rear sub-frame tiltable with respect to a main frame. U.S. Pat. No. 3,442,528 RADEMACHER describes a steering axle mount for a wheeled toy. U.S. Pat. No. 4,359,231 MULCAHY describes a steering mechanism for three wheeled vehicles. EP0026800 RITCHIE describes a folding bicycle with the rear wheel hinged to the main frame. U.S. Pat. No. 2,330,147 RODRIGUEZ describes a scooter car chassis and truck.

Also, some vehicles have been made available on the internet: SBYKE (http://www.sbyke.com), the MAGIC WHEEL (http://www.magicwheel.com) and the YIKEBIKE (http://www.yikebike.com) and BERGMONCH bike (www.bergmoech.com). Older vehicles include the Laufmachine, the Drasine and a bicycle with Whatton handle bars.

Further documents include US2008/217085 WERNLI, U.S. Pat. No. 3,860,264 DOUGLAS, U.S. Pat. No. 4,657,272 DAVENPORT, US2008/0143073 UNGAR, JP2001095865 HIGANO.

The above vehicles have, in the main, not seen widespread adoption for one reason or another.

There is a continuing need for a non-motorized vehicle that make the best use of human propulsion, that is very easy to use and easy to transport in crowded environments for example public transport such as buses or trains, and easy to transport in the boot of a car.

Attempts to solve the problem with simpler vehicles such as foldable scooters and skateboards have been proposed as aids in commuting, being easy to carry in other forms of transport (such as trains, buses and cars). These have failed to achieve widespread adoption for various reasons. There is therefore a continuing need to provide a vehicle which has low rolling resistance, is simple and safer to use, compact in size and of low weight. Furthermore, improving human propulsion, in non-motorised vehicles, can enable people to extend their capabilities in terms of distance traveled for an equivalent amount of energy and/or strength expended. This applies to fit, healthy individuals who may wish to use such a self-propelled vehicle for transport and/or exercise and to less fit and healthy individuals who may wish to use such a vehicle to improve their ability to exercise and/or transport themselves safely. There is a continuing need to improve upon existing self-propulsion vehicles to enable a wider variety of individuals to use self-propulsion vehicles in a wider variety of circumstances, e.g. for the weak or infirm to improve their ability to exercise.

The present invention seeks to alleviate one or more problems described above.

SUMMARY OF THE INVENTION

In a first aspect the invention provides a vehicle drivable in use by a person walking or running whilst seated comprising:
a frame;
a large diameter front wheel, non-steerable with respect to the frame;
a seat for supporting a user's weight whilst walking or running;
the frame being configured to carry the seat suspended on the front wheel;
a small diameter, steerable, rear wheel journaled to the frame at a steering pivot axis;
the seat being rotatable forwardly with respect to the front wheel and comprising a seat base for supporting a user and a backrest for engaging a user's back in use, preventing the seat rotating forwardly during use.

In a second aspect the invention provides a vehicle comprising:
a frame;
a large diameter front wheel, non-steerable with respect to the frame;
a seat for supporting a user's weight whilst walking or running;
the frame being configured to carry the seat suspended on the front wheel;
a small diameter, steerable, rear wheel journaled to the frame at a steering pivot axis;
the seat being rotatable forwardly with respect to the front wheel;
and further in which the frame is arranged to carry most of a user's weight on the front wheel, e.g. in a usual riding position.

Optionally, this may be achieved by providing a vehicle in which the frame is arranged to carry the seat on the front wheel so that a line of action from a seat base of the seat to the front wheel axle is at an angle of ≤15°, ≤10°, ≤5°, 0.5° to 15°, 0.5° to 10°, 0.5° to 5°, 1° to 15°, 1° to 10°, 1° to 5°, more preferably 3° to 12°, 5° to 10° to the vertical during use. Optionally, this may be achieved by providing a vehicle in which the frame is arranged to distribute the weight of a user on the seat (e.g. in use when stationary and/or at low speeds and/or at high speeds) between the front and rear wheels (e.g. in an initial and/or usual riding position) in the ratio of greater than or equal to 65%:35%, or greater than or equal to 70%:30%, or greater than or equal to 75%:25%, or greater than or equal to 80%:20%, or greater than or equal to 85%:15% or greater than or equal to 90%:10% or greater than or equal to 95%:5%.

In a third aspect, the invention provides a vehicle comprising:
a frame;
a large diameter front wheel, non-steerable with respect to the frame;
a seat for supporting a user's weight whilst walking or running;
a frame configured to carry the seat suspended on the front wheel;
a small diameter, steerable, rear wheel journaled to the frame at a steering pivot axis;
and further in which the vehicle comprises a steering mechanism to steer the vehicle into a turn, e.g. when the vehicle leans into a turn.

In a fourth aspect the invention provides a precursor vehicle to the vehicle of the first or second or third aspects.

In a fifth aspect the invention provides use of a vehicle or a precursor vehicle comprising: sitting on the seat, driving the vehicle by walking or running.

As will be understood by those skilled in the art any feature of any embodiment of any aspect of the invention may be used in any other embodiment of any aspect of the invention and may be used in combination with any other feature of any embodiment of any aspect of the invention.

The small rear wheel is preferably steerable with respect to the frame. The large front wheel may be of approximate diameter of a user's leg (typically an adult human), thus the large front wheel may be of similar size to a bicycle wheel for the user. Example sizes include 630 mm, 622 mm, 571 mm, 559 mm, 547 mm, 540 mm, 520 mm, 451 mm, 419 mm, 27 inches, 26 inches, 24 inches, 20 inches. The rear wheel, which may be a castor wheel, is much smaller having a diameter optionally six to ten times less than that of the front wheel, or even up to four to ten times less.

Optionally the vehicle comprises a first tilting mechanism configured to enable a user to tilt rearwardly with respect to the frame to assist in braking (e.g. by slowing or stopping) the vehicle in use, e.g. by action of a user's feet on the ground and/or by leaning of a user's body rearwardly to counter forward momentum and/or by a braking mechanism acting for example, on the front wheel as described elsewhere herein. Optionally, the first tilting mechanism comprises one or more resilient members arranged to return the vehicle to an initial pre-tilted configuration. Optionally, the first tilting mechanism comprises the frame and rear wheel configured so as to be tiltable with respect to one another under load to enable a user to tilt rearwardly with respect to the frame. Optionally, the first tilting mechanism is tiltable so as to increase the angle between the vertical and a first line of action from the front wheel axle to the seat base and/or between a first line of action from the front wheel axle to the seat base and a second line of action from the rear wheel axle to the seat base.

Alternatively or in addition, the first tilting mechanism comprises the seat back and/or seat base being tiltable rearwardly with respect to the frame.

Optionally, the frame is arranged to carry most of a user's weight on the front wheel e.g. at least when the first tilting mechanism is in an initial, configuration. Optionally, the frame is arranged to carry the seat on the front wheel so that a line of action from a seat base (e.g. a central balance point of a seat base) of the seat to the front wheel axle is at an angle of ≤15°, ≤10°, ≤5°, 0.5° to 15°, 0.5° to 10°, 0.5° to 5°, 1° to 15°, 1° to 10°, 1° to 5°, more preferably 3° to 12°, more preferably 5° to 10° to the vertical during use. Optionally, the frame is arranged to distribute the weight of a user on the seat (e.g. in use when stationary and/or at low speeds and/or at high speeds) between the front and rear wheels (e.g. in an initial untilted and/or tilted configuration) in the ratio of greater than or equal to 65%:35%, or greater than or equal to 70%:30%, or greater than or equal to 75%:25%, or greater than or equal to 80%:20%, or greater than or equal to 85%:15% or greater than or equal to 90%:10% or greater than or equal to 95%:5%. By distributing a user's weight predominantly to the front wheel in use, the vehicle benefits during motion from the lower rolling resistance and greater ability to pass over obstacles of the large front wheel providing an easier, smoother, safer ride.

The small rear wheel is preferably steerable with respect to the frame. Optionally, the vehicle comprises a steering mechanism to steer the vehicle into a turn (e.g. when the vehicle leans into a turn). Optionally, the steering mechanism is configured to be less sensitive at higher vehicle speeds so as to require more force and/or a higher degree of leaning of the vehicle to the side to effect a turn at higher vehicle speeds. Optionally, the steering mechanism comprises the rear wheel contacting the ground at a contact patch and the rear wheel having a mass distribution so that the centre of mass of the rear wheel is rearward of the rear wheel contact patch with the ground. Optionally, the rear wheel comprises an additional mass e.g. to provide the required mass distribution, located rearward of the rear wheel contact patch with the ground. Optionally, the rear wheel comprises an additional mass located rearward of the perimeter of the rear wheel. Typically, the mass distribution of the rear wheel should be sufficiently rear of the contact patch so that it counteracts the tendency of the combined centre of mass of the front wheel and user acting to the rear of the front wheel contact patch under gravity, to steer the vehicle in the other direction.

Optionally, the steering mechanism comprises a rear wheel steering pivot axis inclined rearwardly so that the top of the pivot axis lies rearward of the bottom of the pivot axis when the vehicle is viewed from the side.

Optionally, the steering mechanism is configurable, e.g. by applying a load, so as to vary the steering characteristics of the vehicle e.g. to be less able to turn by rotating the steering mechanism by applying a torque under increased load. Thus, in an example embodiment under increased load, e.g. when sitting, it is (relatively) easy to turn by leaning the vehicle to the side but less easy to turn by applying a torque to rotate the rear wheel about a vertical axis to change the direction of steering of the vehicle. Similarly, under low load, e.g. when a user is standing or resting lightly on the seat, the steering is configured so it is easier to turn by applying a torque to rotate the rear wheel about a vertical axis to change the direction of steering of the vehicle but less easy to turn by leaning of the vehicle to the side. This is preferably facilitated by the provision of a tiltable steering mechanism such as a rearwardly inclinable steering pivot axis.

Optionally, the steering mechanism is tiltable rearwardly and forwardly with respect to the frame, preferably between a first initial position and a second rearwardly inclined position. Optionally, the tiltable steering mechanism comprises a tiltable rear wheel steering pivot axis for the rear wheel e.g. tiltable forwardly and rearwardly (e.g. back to its initial position) with respect to the frame. Optionally, the tiltable rear wheel steering pivot axis is tiltable from a first initial position to a second position in which it is inclined rearwardly so that the top of the pivot axis lies rearward of the bottom of the pivot axis when the vehicle is viewed from the side. Optionally, the tiltable rear wheel steering pivot axis is vertical or substantially vertical in its first initial untilted position or the tiltable rear wheel steering pivot axis is inclined rearwardly in its first initial untilted position and is inclined further rearwardly when tilted in its second position. Preferably the steering pivot axis is vertical or substantially vertical in its first initial untilted position. Optionally, the projection of the tiltable rear wheel steering pivot axis on the ground falls forwardly of the contact patch of the rear wheel when the tiltable rear wheel steering pivot axis is in a a first initial untilted position and/or when the tiltable rear wheel steering pivot axis is in a second tilted position. Optionally, the projection of the rear wheel steering pivot axis on the ground falls within the contact patch of the rear wheel when the tiltable rear wheel steering pivot axis is in a first initial untilted position and/or in which the projection of the steering pivot axis on the ground falls forwardly of the contact patch of the rear wheel when the tiltable rear wheel steering pivot axis is in a second tilted position. Optionally, the tiltable rear wheel steering pivot axis of the rear wheel is tiltable from a first position to a tilted second position (e.g. rearwardly inclined or further rearwardly inclined) when load is applied by a user e.g. by sitting down and/or by leaning backwards. Optionally, the rear wheel is resiliently mounted to the frame via the tiltable rear wheel steering pivot axis so as to tend to return the steering pivot axis to an initial untilted (or less rearwardly tilted) position, for example, when a load is removed (the user stands up). Optionally, the rear wheel tiltable steering pivot axis is tiltable from a first initial position to a second fully tilted position when a user sits on the seat. Optionally, the tiltable rear wheel steering pivot axis is provided with an offset with respect to a rear wheel axle, and the rear wheel steering pivot axis, rear wheel and offset are configured such that when tiltable rear wheel pivot axis is tilted rearwardly to a second fully tilted position, the top of the rearwardly inclined rear wheel steering pivot axis is substantially vertically above the rear wheel axle and also substantially vertically above the contact patch of the rear wheel. Thus, it is then difficult to apply a torque to rotate the rear wheel, but the vehicle can still steer by a user leaning the vehicle to one side and taking advantage of the rearwardly inclined rear wheel steering pivot axis. Various embodiments can be envisaged by those skilled in the art from the information herein e.g. in which the steering pivot axis is adjustable by translation and/or tilting of the rear wheel steering pivot axis to control the steering characteristics of the vehicle at higher speeds and/or under load.

Optionally, the steering mechanism is configured to provide an increase in mechanical trail of the rear wheel at higher speeds and/or when tilted and/or under greater load.

Optionally, the vehicle comprises a braking mechanism (e.g. on the front wheel) operable to brake the vehicle upon tilting of a user's back with respect to the frame. Optionally, the braking mechanism comprises a resiliently tiltable seat back connected to a brake caliper operable on the front wheel upon tilting of the seat back. Optionally, the braking mechanism comprises a resiliently tiltable rear wheel resiliently tiltable with respect to the frame and connected to a brake caliper operable on the front wheel upon tilting of the rear wheel with respect to the frame.

Optionally, the vehicle comprises two or more laterally spaced rear wheels with a common horizontal wheel axle, or a rear wheel having a lateral wheel width and associated rear wheel axle width greater than corresponding lateral widths of the front wheel and/or front wheel axle for example, wide enough to ensure the axle remains parallel to the ground as the front wheel leans to the side for a useful range of leaning angles. Optionally, the rear wheel(s) has/have a rear wheel shape when viewed in cross-section having one or more curved or inclined surfaces adapted to facilitate steering of the rear wheel into a turn for example, the cross-section may have one or more curved and/or inclined surfaces arranged to facilitate tilting into a turn.

Optionally, the vehicle comprises a front wheel having a diameter of the order of or slightly smaller than the leg of a proposed user e.g. of an adult human leg. Optionally, the diameter of the rear wheel is equal to $1/4^{th}$ to $1/10^{th}$ or $1/6^{th}$ to 1/10th the diameter of the front wheel. Optionally, the vehicle comprises a backrest of height above the seat base of the seat higher than an intended user's centre of mass when a user is seated on the seat. Preferably, the backrest is of a height substantially higher than a user's centre of mass when seated on the seat of a height e.g. being of additional height of 1 to 2 times that of the distance between the seat and an intended user's centre of mass, above the intended user's centre of mass.

BRIEF DESCRIPTION OF THE DRAWINGS

The invention will now be described, by way of example only, with reference to the following Figures in which like reference numerals refer to like features. Variations of the embodiments described will be apparent to those skilled in the art from the information disclosed in this application, all such embodiments are intended to be covered by the present application.

FIG. 1 shows a schematic side elevation view of a first precursor of a vehicle according to the invention.

FIG. 2 shows a schematic side elevation view of a person walking.

FIG. 3 shows a schematic side elevation view of a second precursor of a vehicle according to the invention, having a backrest.

FIGS. 11A and 11B show side and front elevation views of a vehicle (430) according to an example embodiment of the invention having optionally two laterally spaced rear wheels, optionally an alternative steering mechanism here comprising an adjustable e.g. tiltable rear wheel steering pivot axis and optionally a rotatable seat back to facilitate redistribution of weight and/or braking and/or operation of the steering mechanism.

FIG. 11C is a plan view from above of the rear wheel arrangement of FIGS. 11A and 11B.

FIGS. 11D to 11F show schematic front elevation views of alternative rear wheel arrangements to those of FIGS. 11A, 11B and 11C.

FIGS. 13A, 13B and 13C show schematic plan, front and side elevation views of the vehicle of FIG. 11A with no load (the user is standing or resting his weight lightly on the vehicle, both feet being on the ground) illustrating a vertical steering pivot axis 40 in a first initial position.

FIGS. 14A, 14B and 14C show schematic plan, front and side elevation views of the vehicle of FIG. 11A loaded with most of the rider's body weight and leaning (to the right) in order to effect a turn to the right illustrating a rearwardly inclined steering pivot axis 40 in a second tilted position.

FIGS. 17A and 17B show schematic, rear, elevation views of a vehicle according to a further example embodiment of the invention, having a laterally rotatable backrest.

FIG. 18A shows a schematic side, part-elevation, part-perspective view of a portion of a vehicle according to a further example embodiment of the invention showing a seat and a laterally rotatable backrest 122. A resilient member 66 for controlling lateral inclination of the laterally rotatable backrest 122 is shown in perspective mounted on seat base 19 via lower member 62.

Figure 4:
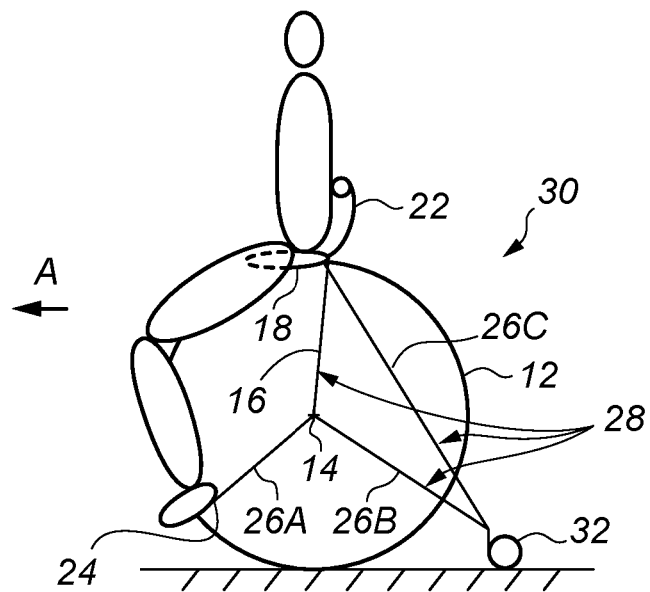
FIG. 4 shows a schematic side elevation view of a vehicle (30) according to an example embodiment of the invention with a person resting their feet on a footrest whilst coasting in the direction of forward motion (see arrow A).

FIG. 18B shows a schematic side, part-elevation, part-perspective view of a portion of a vehicle according to a further example embodiment of the invention (similar to that seen in FIG. 18A) in which the resilient member 66 is now attached to a lower portion 122B of the backrest 122 rather than directly to seat base 19.

FIG. 18C shows a schematic, front, elevation view of a vehicle according to a further example embodiment of the invention (similar to that seen in FIG. 18B) having a laterally rotatable backrest 122.

DETAILED DESCRIPTION

FIG. 1 shows a first precursor for a vehicle 10 according to the invention comprising a large wheel 12 having a wheel axle 14 supporting an upwardly extending seat post 16 for carrying a seat 18. Vehicle 10 is similar to a unicycle but without pedals having an arrangement comprising a seat 18 carried by seat post 16 suspended on wheel axle 14 in the manner of an inverted pendulum. To attempt to move forwards a user sitting on seat 18 places his or her feet on the ground and by walking or running applies a force in a horizontal direction, so as to move in direction of arrow A, say. The force effectively acts at the centre of mass (cM) of a person on the seat at a distance of, say, $d_1$, from wheel axle 14 producing a torque, $T=F_{cM} \times d_1$, around wheel axle 14 causing seat 18 to rotate about wheel axle 14 instead of causing the vehicle to advance. Furthermore, if a user's weight is applied to the vehicle, other than directly vertically over wheel axle 14, the weight of the user under gravity ($W_{cM}$ acting vertically) positively reinforces the action of the torque as a result of the horizontal force on seat 18. Whilst it may be possible for experts to ride a precursor vehicle of the type shown in FIG. 1, as with a unicycle, it would require practice and also additional means of interacting with the vehicle or a different means of utilising the feet (such as the pedals of a traditional unicycle) and great expertise before being accomplished.

FIG. 2 shows a side view of a person walking forwards in the direction of arrow A illustrating an approximate position of a person's centre of mass, cM, and the reaction, R, of a front foot against the ground. It is apparent from the Figure that a person walking can choose to apply a rearwardly directed force, $F_{bR}$, if desired, as a result of the action of the feet on the ground, and the application of back and stomach muscles, to cause rotation of the back rearwards, about the hips. The inventors have appreciated that a person walking may, if provided with a vehicle of suitable height and design, be able to exert both forward motion on the vehicle by walking or running to propel the vehicle forward and simultaneously, by action of the internal muscles of the person combined with reaction of their feet pushing on the ground, exert a suitable force directed rearwardly to counterbalance the forward torque T seen in vehicle 10 of FIG. 1. An alternative vehicle, which utilises this concept, is second precursor vehicle 20 seen in FIG. 3. Vehicle 20 comprises a large wheel 12, having a wheel axle 14 supporting a frame in the form of an upwardly extending seat post 16 carrying a seat 18 suspended on it. Seat 18 comprises a seat base 19 and is further provided with a backrest 22. Advantageously, backrest 22 is of sufficient height to enable a user to apply pressure with relatively little effort through contact rearwardly with his or her back on the backrest 22 above the person's centre of mass, cM. Thus, backrest 22 is sufficiently high to enable a user to apply a rearward force by action of internal muscles applying pressure through the back to the backrest 22 via a reaction through the hips, legs and feet to the ground to counter the tendency of seat 18 to rotate forwards when vehicle 20 is propelled into motion. If the distance from the seat to a user's centre of mass is L the backrest 22 may be for example 1 to 2 times L above the centre of mass of a user. If the backrest is too low (e.g. below the level of the centre of mass of the user) then the application of force by a user may result in forward rotation of the seat, as explained in relation to FIG. 1. If the backrest 22 extends only a modest amount above the centre of mass of a user, this arrangement may require excessive force against backrest 22 for a modest movement forward.

Thus, when a user applies a force in a forward direction (in direction of arrow A), this can be described as a force, $F_{cM}$, acting at the centre of mass of the person at a distance $d_1$ from wheel axle 14. Simultaneously, a counterbalancing torque can be applied by a user via the seatback 22, the force being represented by $F_{bR}$ acting at a distance $d_2$ from wheel axle 14, thus, $$F_{cM} \times d_1 = F_{bR} \times d_2.$$

The total torque is therefore zero. As $d_1$ is less than $d_2$ then there is a net force, $F_{cM} - F_{bR} > 0$, in the direction of arrow A propelling the vehicle forward with no net torque. It will be appreciated by those skilled in the art that a user may actively apply a force acting on his centre of mass, and that also a user's weight acts passively at his centre of mass as a force $W_{cM}$. Thus, the tangential components of $F_{cM}$ and $W_{cM}$, when the seat 18 is no longer directly above the wheel axle, contribute to the torque to rotate the seat.

Although the precursor vehicle 20 represents a considerable improvement, and will be useful for leisure or sports, it may be difficult for anyone other than an expert user to balance because seat 18 suspended on seat post 16 acts as an inverted pendulum and is able to rotate freely backwards as well as forwards. The inventors have appreciated that a particularly advantageous arrangement is one in which a user may freely apply a force rearwardly to the backrest to counter the tendency of the vehicle to rotate forwardly when a forwardly propelling force is applied whilst, at the same time, preventing rotation of the seat rearwardly by provision of a small rear wheel.

FIG. 4 shows one example of a vehicle 30 according to this preferred embodiment of the invention, vehicle 30 comprising a large front wheel 12 of approximate diameter just less than the inside leg of a user, e.g. an adult human, and a small rear wheel 32. The diameter of rear wheel 32 is typically six to ten times less than that of front wheel 12 although a diameter of up to four times less may be used. As will be understood by those skilled in the art from the information disclosed in this application, the rear wheel is preferably designed to function as a rear castor wheel and its size relative to the large front wheel may be selected accordingly. Similarly the front wheel is designed to carry most of a user's weight and to pass comfortably beneath a user sitting on the seat 18 when walking or running and as such, its size may be selected accordingly. A typical size of front wheel may be a size of a wheel for a normal two wheeled bicycle for a user of that size, or slightly larger. Also the seat 18 may be variable in height, e.g. on seat post 16, to accommodate some variation in leg length and provide a comfortable riding position for a user in use.

Vehicle 30 comprises a frame 28 mounted on front wheel axle 14 and connecting front wheel 12 to rear wheel 32. Frame 28 comprises an upwardly extending seat post 16 for suspending a seat 18 above front wheel axle 14. Indeed, the arrangement of frame 28 and seat post 16 is such that the majority of the weight of a user is carried on front wheel axle 14 and is spread between the front and rear wheels in proportions as described elsewhere herein. Seat post 16 may comprise a single post immediately underneath seat 18. Seat post 16 may be supported by one or preferably two laterally spaced downwardly depending members. Preferably, two laterally spaced forwardly extending struts 26A are provided extending downwards and slightly forwardly from seat post 16 either side of front wheel 12 and terminating in laterally spaced feet supports 24 for a person to rest their feet on whilst coasting. A single foot support for both feet may alternatively be provided just in front of front wheel 12 but this is less preferred. Two sets of laterally spaced rearwardly extending struts 26B and 26C co-operate with seat post 16 to form frame 28, and terminate in a mount (see item 35 in FIG. 5) for rear wheel 32. Seat 18 is comprises a seat base 19 for supporting a user and a backrest 22 for enabling a user to exert a rearward counterbalancing force from a user's feet in contact with the ground, thus preventing seat 18, which carries the majority of the weight of the user on the front wheel, from rotating forwardly during use (along with frame 28 and rear wheel 32).

It will be noted that the vehicle preferably does not have pedals so as to facilitate driving of the vehicle by the action of a user by walking or running whilst sitting on seat 18. (Alternatively any pedals and any associated chain mechanism are retractable to a non-use position which does not interfere with walking or running of a user when the user is sitting on seat 18). Pedals would interfere with positioning of a user's legs on the ground whilst sitting on seat 18, either side of front wheel 12. It will also be noted that vehicle 30 does not have handlebars or a steering post located in the front of the vehicle for steering the front wheel 12, thus, seat 18 and any user mounted on seat 18 are not prevented in any way from rotating forwardly during use (foot rests 24 when provided being located sufficiently high above the ground in use). Indeed, in use, a user may easily dismount vehicle 30 by walking forwards. Thus, a vehicle 30 is provided having a seat mounted over the front wheel to carry the majority of the user's weight, the seat suspended on front wheel axle 14. The vehicle is preferably configured without handlebars or associated steering post in such a manner so as to enable a user to step off the front of the vehicle without encountering any obstacles. This greatly increases the safety of the device as a user wishing to dismount, or being forced to dismount, should the front wheel encounter an obstacle and stop suddenly, may simply carry on walking or running forwards leaving the vehicle behind without risk of encountering any protruding parts on the vehicle.

A person skilled in the art will appreciate that for a user to step off the front of vehicle 30, the seat 18 and seat post 16 must be of sufficient height above the outer periphery of front wheel 12 to be rotatable forwardly over the top of front wheel 12.

Seat 18, and/or seat post 16, may be adjustable in height, e.g. these may be telescopically mounted with respect to one another to accommodate differently sized user's legs on a typically sized front wheel. Further, backrest 22 of seat 18 may be foldable and/or tiltable forwardly to facilitate storage and/or for other reasons, tiltable rearwardly e.g. to provide a first tilting mechanism enhancing the ability of a user to slow the vehicle (by allowing a user to tilt backwards) and/or to operate a braking mechanism, such as a brake caliper as described elsewhere.

Figure 5:
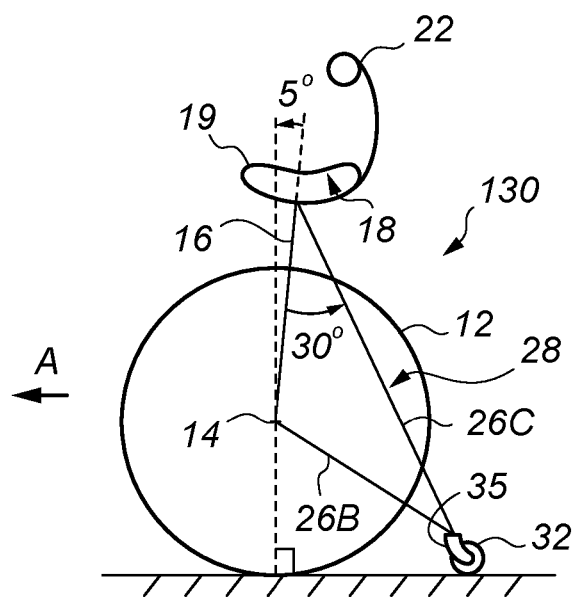
FIG. 5 shows a vehicle (130) similar to that of FIG. 4 (here without a footrest or footrests) illustrating a slight tilt to the rear of the line of action of the user's weight on seat 18 (here exemplified by a slight tilt to the rear of the seat post 16 with respect to the vertical axis), according to an example embodiment of the invention.

Referring now to FIG. 5, an alternative vehicle 130 in accordance with a further embodiment of the invention is shown. Vehicle 130 is not provided with a forward strut 26A or foot rest(s) 24 although optionally these may be provided. Here, frame 28 is arranged so that a user's weight does not act in a line directly vertically above front wheel axle 14 but rather at a small angle (here 5°) to the rear of a line extending directly vertically above wheel axle 14. A small tilt of seat post 16 (at say 5°) from a vertical line directly above wheel axle 14 enables a user's weight to be predominantly carried by seat 18 and in particular seat base 19 suspended on seat post 16 on front wheel axle 14, but provides for a small proportion of a user's weight to rest on rear wheel 32 via downwardly and rearwardly extending laterally spaced (typically one either side of front wheel 12) frame posts 26C. In this way, a compromise is made between carrying a user's weight on the front wheel, enabling ease of rolling of a large front wheel (wheel 12) over obstacles on a ground surface, and carrying some of the user's weight on a rear wheel, enabling ease of use for a user by reducing the tendency of the user to tilt forwards during use due to some weight of a user being carried by the rear wheel. It is advantageous for the weight of the user on the rear wheel to be kept as low as possible whilst, at the same time, providing a sufficient degree of rearward tilt of the line of action of a user's weight on the seat base of seat 18 (behind a vertical line extending directly above front wheel axle 14) to facilitate a comfortable relaxed riding position and in combination with the action of a user's back on the backrest avoid the tendency for the seat 18 to rotate forwards. The frame 28 is preferably arranged to carry the seat on the front wheel so that a line of action from the seat base 19 to the front wheel axle is close to vertical but offset to the rear from vertical at an angle of ≤15° ≤10°, ≤5°, 0.5° to 15°, 0.5° to 10°, 0.5° to 5°, 1° to 15°, 1° to 10°, 1° to 5°, more preferably 3° to 12°, more preferably 5° to 10° to the vertical during use.

Figure 6:
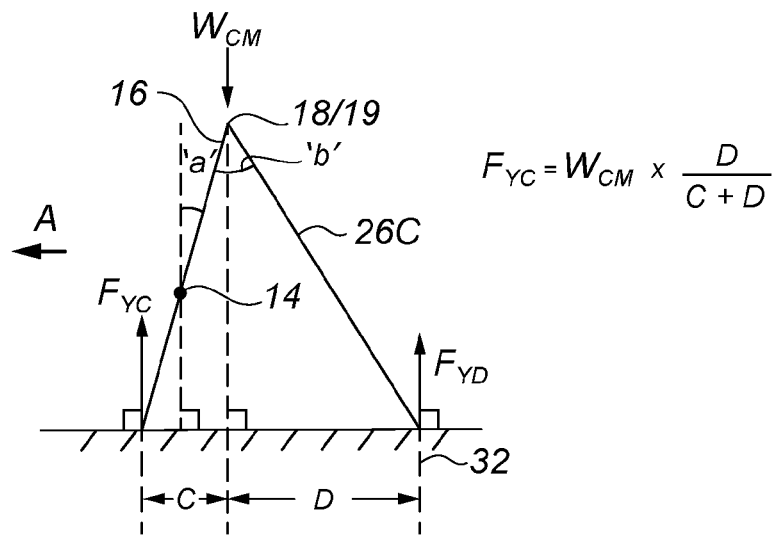
FIG. 6 shows a schematic force diagram of the vehicle of FIG. 5.

FIG. 6 shows a schematic drawing illustrating seat post 16 tilted at an angle 'a' to the rear of the vertical behind wheel axle 14 and seat post 16 and frame post 26C having a frame angle 'b' in between. In this embodiment frame angle 'b' is constant and during tilting the entire frame 28 tilts rearwardly and/or forwardly (altering angle 'a'). Other embodiments can be envisaged in which the frame angle 'b' is adjustable e.g. before riding and/or during riding of the vehicle, as part of first tilting mechanism to facilitate braking and/or as part of the tiltable steering mechanism to facilitate appropriate steering characteristics at higher speeds. Thus, in this embodiment there is an angle 'b' between the line of action of a user's weight on the front wheel axle (e.g. here along seat post 16) and a line of action of a user's weight on the rear wheel axle (e.g. here along rearwardly extending frame post 26C). Calculation of the distribution of the weight, $W_{cM}$, of a user acting on the seat base of seat 18 through seat post 16 and frame post 26, shows that at an angle 'a' of 5° and an angle 'b' of 30° the proportion of front wheel loading is 84% while the back wheel carries 16% of the load. With a front angle of 'a'=10° and 'b'=30°, the load on the front wheel is approximately 70% and the loading on the rear wheel is approximately 30%, the formula for calculating the breakdown of forces $F_{YC}$ (loading of a user's weight on the front wheel) and $F_{YD}$ (loading of a user's weight on the rear wheel) being:

$$F_{YC} = W_{cM} \times (D/(D+C))$$

$$F_{YD} = W_{cM} - F_{YC}.$$

Figure 7:
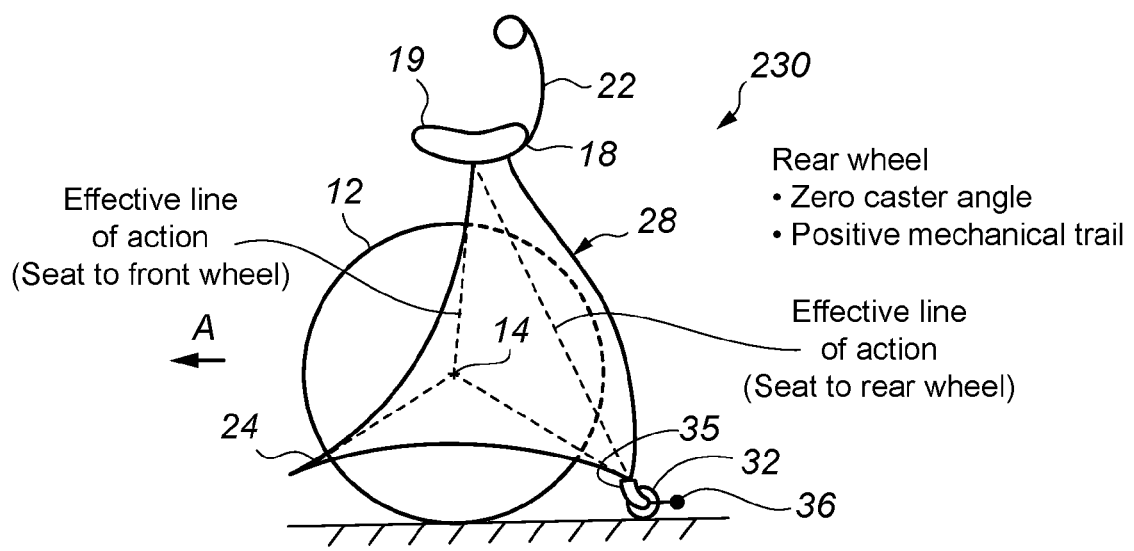
FIG. 7 shows a schematic side elevation view of a vehicle (230) having a composite frame rather than an open frame as in the vehicle of FIG. 4.

FIG. 7 shows an alternative vehicle 230 according to the invention comprises a composite frame 28 rather than the open frame 28 of FIGS. 4 and 5. Frame 28 may be made from fibre glass, carbon fibre or fibre reinforced plastic, plastic, metal such as aluminium, steel or the like. Frame 28 is mounted on wheel axle 14 and carries a rear wheel mount 35 for rear wheel 32. Composite frame 28 is also sculptured to provide two laterally spaced front foot rests 24. Also shown is an additional mass 36 on rear wheel 32 mounted on the axle of wheel 32 to provide a steering mechanism by altering the weight distribution associated with wheel 32 to assist with steering as will be described later.

Figure 8:
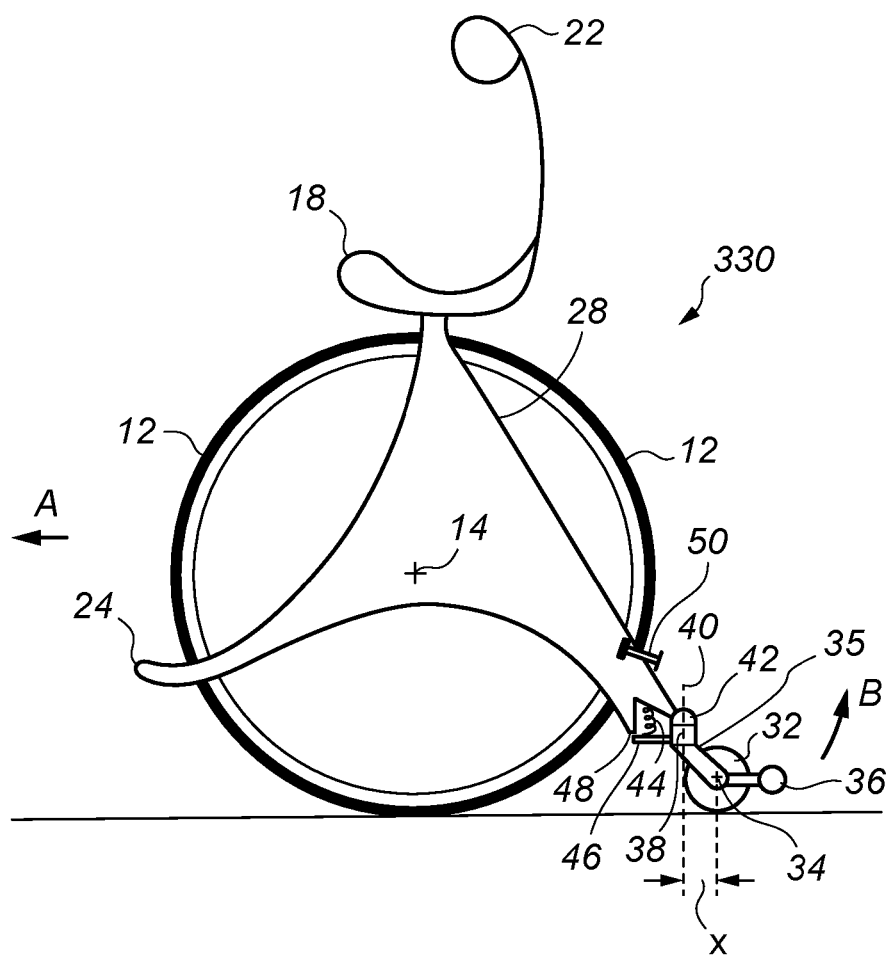
FIG. 8 shows a schematic side elevation view of a vehicle (330) with a frame similar to that in FIG. 7 having a first tilting mechanism comprising an adjustable (here forwardly tiltable) rear wheel steering pivot axis and a steering mechanism comprising an additional mass mounted on rear wheel 32 to alter the overall mass distribution of rear wheel 32.

FIG. 8 shows a further alternative vehicle 330, similar to that seen in FIG. 7, also comprising a composite frame 28 although here seat 18 is much closer to wheel 12 and vehicle 330 comprises a first tilting mechanism to facilitate a user's ability to brake the vehicle by action of feet on the ground by a user tilting rearwardly to counteract forward momentum. Here, the first tilting mechanism comprises a tiltable rear wheel steering pivot axis 40, titlable under load forwardly with respect to the vehicle 330 to facilitate braking by a user leaning rearwardly. Vehicle 330 is also provided with a steering mechanism in this example embodiment comprising an additional mass 36 mounted on rear wheel 32 for altering the steering characteristics of rear wheel 32 on its tiltable steering pivot axis 40. Rear wheel mount 35 is journaled to frame 28 via steering pivot pin 38 and has a steering pivot axis 40 defined in this example embodiment by steering pivot pin 38. Rear wheel 32 is mounted on frame 28 by steering pivot pin 38 which is typically vertical (or substantially vertical) when unloaded or when the load is not enough to overcome the pre-loaded force provided by resilient member 44, or equivalent e.g. a torsional spring (not shown), acting against stop 48.

Thus, vehicle 330 has a first tilting mechanism here comprising a rear wheel mount 35 rotatable about a horizontal axis with respect to frame 28 via a rear wheel adjustment mechanism, here a rear wheel adjustment pivot 42. Pivot 42 is horizontal, facilitating tilting of frame 28 via rotation of rear wheel mount 35, rear wheel 32 (and where provided additional mass 36) in the direction of arrow B about pivot 42 when a pre-determined amount of loading is placed on rear wheel 32. The amount of loading required to displace the rear wheel 32 about the horizontal axis defined by rear wheel adjustment pivot 42, is determined by selection of resilient member 44. Resilient member 44 may be a spring acting, for example, between a generally horizontal engagement member 46 mounted on rear wheel mount 35 and frame 28. Engagement member 46 is prevented from rotating further in a clockwise direction (in FIG. 8) by a stop 48 on frame 28. In this embodiment in which the tiltable steering pivot axis 40 provides a first tilting mechanism, spring 44 may be quite strong, so that a user will have to apply some effort to overcome spring 44 to facilitate his leaning back on the vehicle to counteract forward momentum when braking the vehicle. It will be appreciated by those skilled in the art that the tiltable steering pivot axis 40 is tiltable to a position lying within a continuous range of possible positions, the position adopted depending upon how much force is applied to counteract resilient member 44.

Figure 9A:
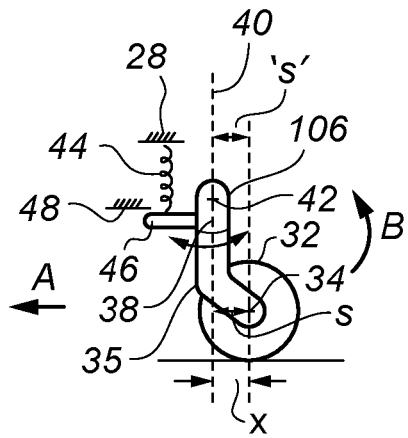
FIGS. 9A and 9B show schematic side elevation views of the rear wheel mount and rear wheel of FIG. 8 in respectively an initial position (shown here with an initially vertical rear wheel steering pivot axis 40 the top of the pivot axis being above the bottom of the pivot axis) and a forwardly tilted position (shown here with a forwardly inclined rear wheel steering pivot axis 40) to facilitate weight redistribution of a user's weight to allow a user to lean back to counter forward momentum and so aid slowing down of the vehicle by the action of one or more of a user's feet on the ground and/or activation of an optional additional brake mechanism (not shown).
Figure 9B:
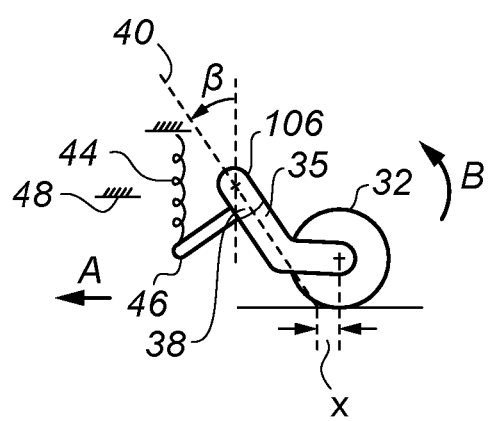

Referring now to FIGS. 9A and 9B, a close-up of a first tilting mechanism is shown comprising, in this example embodiment rear wheel mount 35, rear wheel adjustment pivot 42, resilient member 44, engagement member 46 and stop 48. The first tilting mechanism is shown in unloaded (FIG. 9A) and heavily loaded (FIG. 9B) positions respectively. On application of a load to the rear wheel by a user e.g. by leaning back, optionally on a tiltable backrest 22 where provided, (e.g. via reaction with feet on the ground to the front of the vehicle), a user can apply force to rotate rear wheel mount 35 and rear wheel 32 about horizontal rear wheel adjustment pivot 42 in the direction of arrow B. The force applied by a user in such a manner acts against the spring force of a resilient member 44 co-operating between frame 28 and engagement member 46 in the direction of arrow B. Thus, a user can apply force e.g. by leaning backwards to overcome resilient member 44 and rotate wheel 32 in the direction of arrow B, altering the caster angle 'β'. In a rigid frame the angle between the line of action of a user's weight seated on the seat base 19 of seat 18 and front wheel axle 40 (e.g. along seat post 16 where provided) and a line of action between a user seated on the seat base 19 of seat 18 and rear wheel axle 34 (e.g. along post 26C where provided) remains a constant (see angle 'b' in FIG. 6) however the frame 28 tilts rearwardly increasing angle 'a' (see FIG. 6). This tilting of the frame 28 with respect to the rear wheel enables a user to lean further back on the vehicle to counteract the natural forward motion due to forward momentum when a user tries to slow and stop particularly at speed.

It is interesting to note that in FIG. 9A the small rear wheel 32, which is typically a castor wheel, has a zero castor angle β=0 (castor angle being defined as the angle of the steering pivot axis 40 of the rear wheel with respect to the vertical) and a positive mechanical trail 'x' defined as the distance between the projection of the steering pivot axis 40 on the ground in front of or behind the contact patch of wheel 32 on the ground. It is also of note that by tilting the steering pivot axis 40 forwardly with respect to the vertical (as in FIG. 9B), the castor angle β becomes positive and the mechanical trail 'x' is reduced whilst increasing angle 'a' (see FIG. 6). In an alternative embodiment in which the frame 28 is flexible or otherwise adjustable, the frame angle 'b' may also change.

Alternative embodiments can be envisaged in which the ability of a user to tilt back to increase loading on the rear wheel and facilitate braking, e.g. slowing down and/or stopping, of the vehicle, can be provided by varying an offset 's' of the steering pivot axis 40 from the wheel axle at the same time or instead of altering the castor angle 'β'. Thus, the offset 's' of the steering pivot axis 40 (see also FIG. 15) may be varied as an alternative or an addition to varying the castor angle β to vary angle 'a' enabling a user to tilt back further to slow the vehicle. It may be desirable to effect a variation in angle 'a' (or 'a' and 'b' if an adjustable frame is provided) to facilitate a user tilting further back to facilitate braking, without affecting mechanical trail 'x'.

Figure 9C:
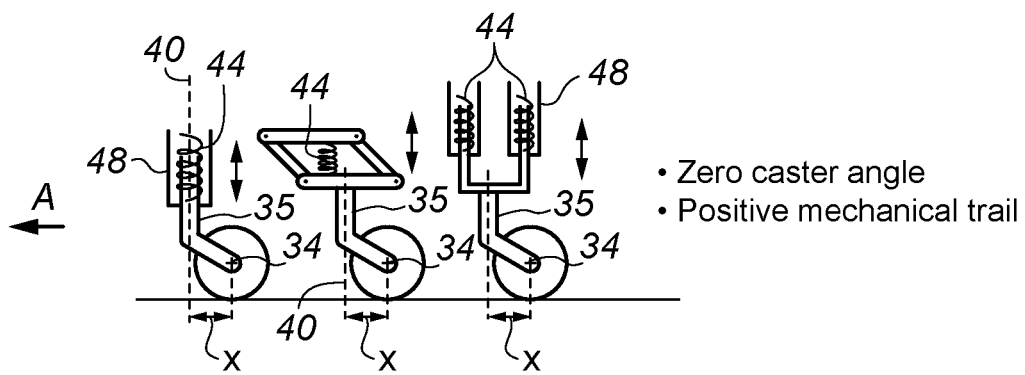
FIG. 9C shows three schematic side elevation views of alternative rear wheel mounts providing alternative first tilting mechanisms comprising an adjustable (but non-tilting) rear wheel steering pivot axis in which variation of the height of the rear wheel mount is achieved facilitating rearward tilting (change of angle) of the frame 28 (increasing angle 'a' in FIG. 6) and resultant ability to redistribute weight to the rear of the vehicle, but without tilting of the steering pivot axis which preferably remains vertical or substantially vertical.

Various embodiments are shown in FIG. 9C in which rear wheel mount is resiliently mounted with respect to a stop component 48 on frame 28 (not shown) so as to vary the height and/or position of rear wheel mount 35 (and rear wheel 32) below the seat base 19 of seat 18 depending upon the loading so as to vary angle "a' to increase, tilt of the frame 28 to the rear under load, allowing a user to tilt further back, e.g. when braking and/or steering at high speeds. The offset 's' does not, however, vary in the embodiments shown in FIG. 9C. The arrangements of FIG. 9C provide this whilst having zero initial castor angle and having no change in castor angle (steering pivot axis 40 remains vertical or substantially vertical at all times) and without altering mechanical trail 'x'. Mechanical trail affects the steering characteristics of the rear wheel and therefore it may be important to keep this constant, or to vary it in a manner that enhances steering, as will be described in later embodiments.

Thus, the length and/or position and/or angle of the relative effective line of action between the seat base 19 of seat 18 and rear wheel axle 34 may be varied, so as to alter angle 'a' (and/or 'b' in an adjustable frame). This can be achieved in a number of ways including varying the distance of the rear wheel axle below the seat base 19 without tilting the steering pivot axis 40 and/or by tilting the steering pivot axis 40 and/or by varying the offset 's' of the steering pivot axis 40. Other mechanisms to achieve the same effect may be envisaged by those skilled in the art from the information in this application. For example, the length and/or position and/or relative position of the effective line of action between seat base 19 and front wheel axle 14 may be similarly varied under loading, as an alternative or in addition.

In connection with steering, preferred embodiments of the vehicle of the present invention may comprise one or more steering mechanisms to enhance the ability of a vehicle to steer into a turn so as to be self-stabilising in a manner of a bicycle, (e.g. by having the capability to steer into a turn and so self-stabilise). In some embodiments the steering mechanism may also function as a tilting mechanism to aid braking.

Figure 9D:
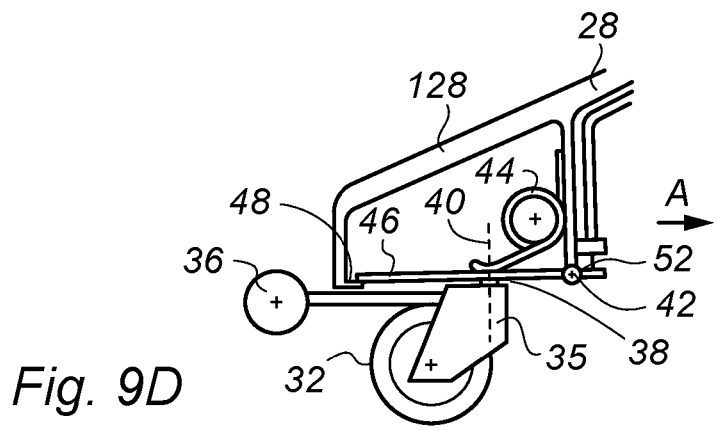
FIG. 9D shows a schematic side elevation view of an alternative rear wheel mount providing an alternative first tilting mechanism, and a steering mechanism in the form of a rear wheel with an additional mass mounted rearwardly of the rear wheel contact patch.

FIG. 9D shows an alternative embodiment in which a first tilting mechanism comprises a horizontal pivot 52 having a horizontal pivot axis 42 about which rear wheel 32 carried on an engagement member 46 about pivot 52 can tilt (so as to facilitate a user leaning further back and/or forward inclination of the steering pivot axis 40) to facilitate braking by a user's feet, is combined with a configurable steering mechanism having an additional mass 36 rearward of rear wheel 32. Thus, this arrangement is used to provide both a first tilting mechanism and a configurable steering mechanism, using an additional mass 32 as will be described below.

Figure 12B:
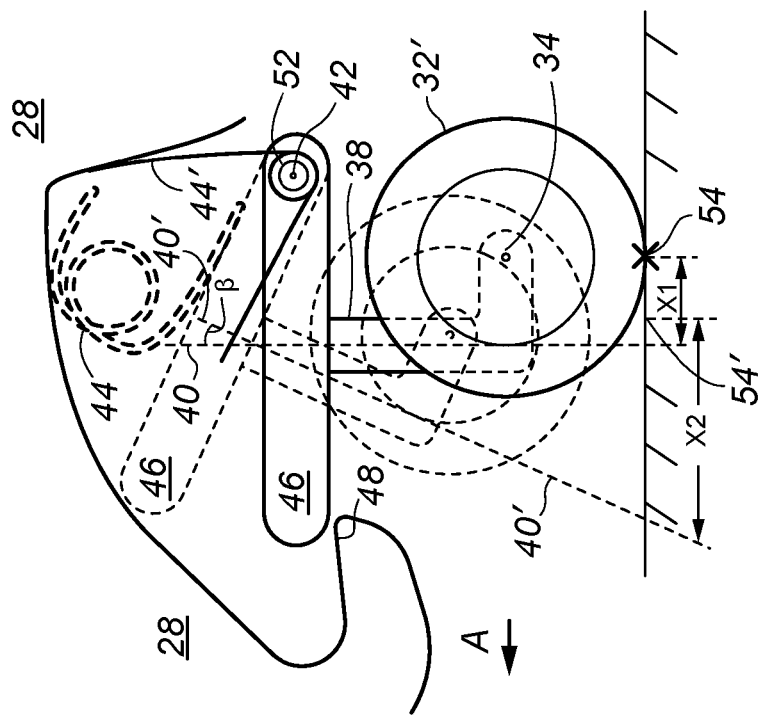
FIGS. 12A and 12B show close up side elevation views of the steering mechanism of FIG. 11A which may be provided in a preferred embodiment of the invention.
Figure 12A:
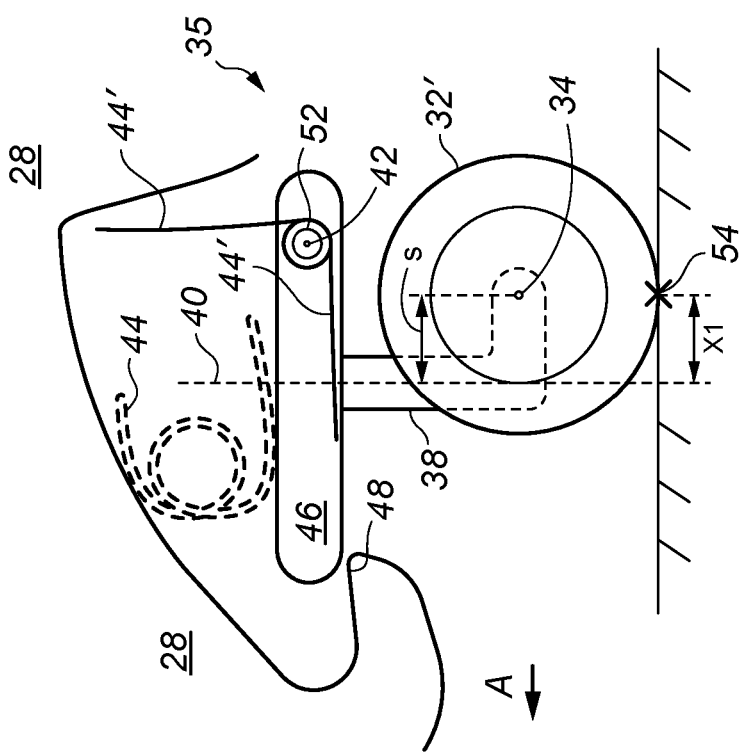

Referring briefly to FIGS. 12A and 12B, yet a further preferred embodiment is shown having an alternative configurable steering mechanism that provides inclination rearwardly of steering pivot axis 40.

Figure 10A:
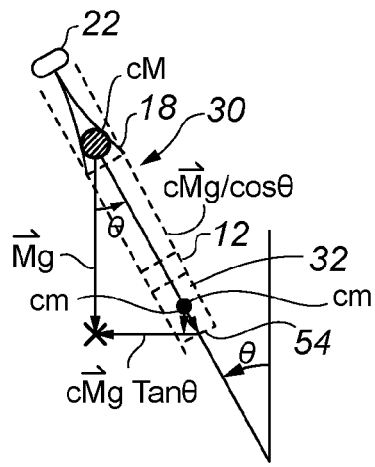
FIG. 10A shows an elevation view from the rear of a vehicle according to an example embodiment of the invention illustrating forces when leaning the vehicle to the side at an angle θ to the left (e.g. during a left turn).
Figure 10B:
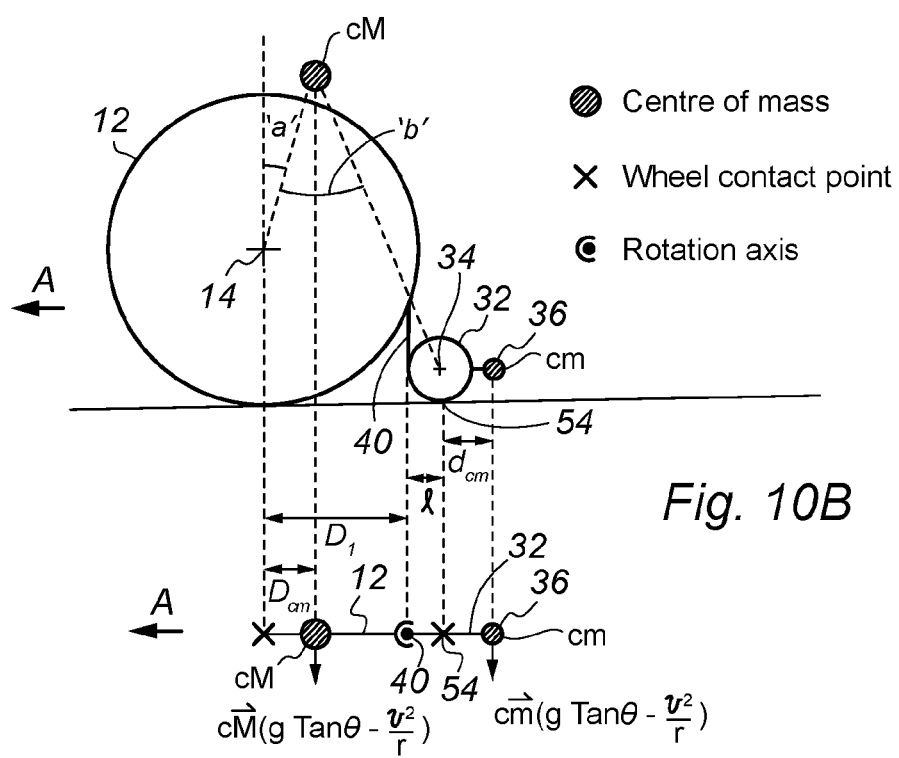
FIG. 10B shows side elevation and plan views of the vehicle of FIG. 10A according to an example embodiment of the invention illustrating schematic mass distribution and location of the centre of mass of the front wheel and user (cM) and the rear wheel with additional mass (cm).
Figure 10C:
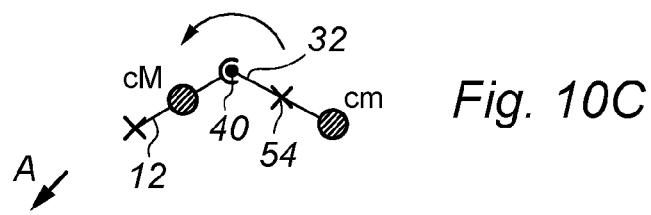
FIG. 10C shows a plan view of the vehicle of FIG. 10B when leaning to the left as in FIG. 10A illustrating steering to the left into the turn by use of an additional mass on the rear wheel (preferably located rearward of the contact patch of the rear wheel with the ground).

Referring to FIG. 10A, representing a vehicle leaning to the side at an angle θ when turning, the vehicle will steer into the turn due to a steering mechanism comprising, in this example, an additional mass 36 located sufficiently rear of rear wheel axle 34. For a vehicle carrying a person, the centre of mass of the vehicle and person acts to a rough approximation on seat 18 (it is in fact somewhat above seat base 19 of seat 18). The weight of a user and front wheel combined may be approximated as 'Mg' (where M is the mass of a user and g is the acceleration due to gravity) acting vertically at an angle θ through the centre of mass 'cM' on the seat base 19 of leaning vehicle 30 at distance $D_{cM}$ behind the contact patch of the front wheel with the ground. Similarly, where a rear wheel is provided with a mass, m, and has centre of mass 'cm' acting to the rear of the contact patch of rear wheel 32 with the ground, the effective weight of the rear wheel is 'mg' and acts at distance $d_{cm}$ behind the contact patch of the front wheel with the ground vertically downwards. Assuming the torque from this lever (cm acting at $d_{cm}$ behind the contact patch) is sufficient to overcome the torque due to gravity acting on the main centre of mass cM at a distance $D_{cM}$ behind the contact patch of the front wheel then this causes the rear of rear wheel 32 to fall down. Thus, rear wheel 32 is rotated about its contact patch with the ground and about steering pivot axis 40 in the opposite direction to front wheel 12, facilitating steering of vehicle 30 into the turn. This can be seen by looking at FIGS. 10A, 10B and 10C in which the effective weight 'Mg' of the user and front wheel as these lean into a turn to the left, causes the steering pivot axis 40 to also lean to the left. Thus, the additional mass 36 carried on the rear wheel axle at preselected distance $d_{cm}$, to the rear of the rear wheel perimeter falls to the left also due to gravity to a greater extent than the remainder of rear wheel 32, the torque of $(cm \times d_{cm})$ overcoming the corresponding torque due to gravity on the front wheel $(cM \times D_{cM})$ facilitating rotation of rear wheel 32 about the steering pivot axis 40 and about the contact patch to the right. Thus, rear wheel 32 steers front wheel 12 into the turn as shown in FIG. 10C, enabling the vehicle to self-stabilise, the trailing rear wheel further facilitating the tendency to straighten up (so that the rear wheel 32 begins again to travel in a straight line behind the front wheel 12).

FIGS. 11A and 11B show a further preferred embodiment of an alternative vehicle 430 in accordance with the invention having an additional or alternative steering mechanism based upon the orientation of the rear wheel steering pivot axis and in particular the provision of a rearwardly inclined rear wheel steering pivot axis 40, preferably tiltable between a first initial (preferably vertical or substantially verticle) to a second rearwardly inclined position. In this case the rear wheel steering pivot axis 40 cannot be used for braking, and an alternative braking mechanism such as a rearwardly tiltable backrest 22 operating on a brake caliper (not shown) may be provided. It will be appreciated by those skilled in the art from the description in the present application, that the tiltable steering pivot axis 40 is preferably bi-stable, being tiltable between a first initial position and a second rearwardly inclined position (one or more end stops at each end position being provided as appropriate), the force required to counteract a resilient member 44 (see FIGS. 12A and 12B) being relatively low, so that it is almost immediately overcome. Thus, steering pivot axis 40 adopts the second position as soon as a load is applied, e.g. to the seat when a user sits down. Other mechanisms to provide a rearwardly inclined steering pivot axis during use, may be envisaged, for example by a mechanical lever operable by foot or hand, as would be understood by those skilled in the art.

Vehicle 430 optionally has a pair of spaced apart lateral rear wheels 32' preferably having a common rear wheel axle 34. Rear wheels 32' are mounted on a common steering pivot pin 38 (also known as a king pin) having here an initially substantially vertical steering pivot axis 40 (optionally it may be initially rearwardly inclined prior to loading although preferably this would be a relatively small rearward inclination). A frame extension 128 (seen in FIG. 11A, but omitted from FIGS. 12A and 12B for clarity) terminates in a horizontal pivot 52 and carries steering pivot pin 38 and a horizontal engagement member 46. Operation of these components is described in more detail in relation to FIGS. 12A and 12B. In an alternative embodiment, for particular applications, a fixed (non-tiltable) rearwardly inclined rear wheel steering pivot axis 40 may be provided.

The vehicle described in FIGS. 11A and 11B is very similar to the one described in FIG. 8 but the rear wheel is now provided by preferably two spaced rear wheels 32' and therefore in normal use the rear wheels' axle tends to remain parallel to the ground surface even when the rest of the vehicle leans to any side. The vehicle may be designed to ensure the projection of the steering pivot axis 40 on the ground remains within the lateral width of the rear wheel(s) during leaning to effect turning at normally expected speeds.

As described in relation to FIGS. 12A and 12B, a steering mechanism is provided by means of a rearwardly inclined king pin 38 (or functional equivalent, such as a mounting plate on a castor wheel as understood by someone skilled in the art) on the rear wheels 32' providing a rearwardly inclined steering pivot axis (top of pivot axis is to rear of the bottom).

Vehicle 430 also comprises a seat 18 having a seat base 19 and a rotatable backrest 22 rotatable with respect to the seat base 19. Backrest 22 may be rotated from an initial riding position, position 1, to a folded position, position 2, for storage. Alternatively, or in addition, backrest 22 is tiltable rearwardly to a position 3 to facilitate a user leaning backwards when trying to brake completely or slow the vehicle (with the result, for the period of slowing or braking, of redistributing the weight so that a little more weight is carried on the rear wheel 32/32') and a user can lean back counteracting forward momentum upon slowing or stopping. In addition to facilitating redistribution of a user's weight to enhance the user's ability to brake completely to a stop or at least slow a vehicle, a tilting backrest may also be used in conjunction with an active brake mechanism to actively brake the vehicle. Thus, vehicle 430 may also incorporate a brake mechanism such as a brake caliper 50, mounted on frame 28, for engaging with front wheel 12 to brake front wheel 12 by applying a brake pad to the front wheel 12. A cable, or other mechanism (not shown), may be provided for facilitating braking using braking caliper 50 by tilting of backrest 22 from a position 1 to a rearward position, position 3 to activate the brake caliper. Other active brake mechanisms can be envisaged by someone skilled in the art.

Frame 28 terminates in a frame extension 128 for mounting rear wheel mount 35, comprising steering pivot pin 38 and engagement member 46, thereon via a horizontal tilting adjustment pivot 52. Initially, preferably rear wheel pivot pin 38 is vertical or substantially vertical so that in its first initial pre-tilted position the rear wheel steering pivot axis 40 is vertical or substantially vertical. The steering mechanism comprising pivot pin 38 defining the rear wheel steering pivot axis 40, 40' is adjustable (here by tilting from a first initial position 40 to a second tilted position 40' almost immediately upon application of a load) by means of being mounted on rotatable engagement member 46 so that steering pivot axis 40 is rotatable. Preferably, the rear wheel steering pivot axis 40 almost immediately adopts a predefined rearwardly inclined second position when a load is applied, e.g. preferably when a user sits down. Whilst two spaced apart wheels are described, one wheel, or one or more wheels of particular shapes may be used. This will be explained in more detail in relation to FIGS. 12A and 12B.

FIGS. 11D to 11F show various rear wheel configurations that may be used as an alternative, or in addition, to any other steering mechanism, such as an additional mass on rear wheel 32 and/or a tiltable steering pivot axis 40/40' and/or a rearwardly inclined steering pivot axis 40, to facilitate steering of vehicle 430 into a turn. These embodiments have inclined and/or curved rear wheel profiles when viewed in cross-section which may be used to facilitate leaning into a turn, in which case the rear wheel axle may not always remain parallel to the ground. FIG. 11D shows a ball having an extended horizontal rear wheel axle 34 preferably wider than the front wheel axle. The outer surface of the ball, when viewed in cross-section, curves upwards so that, upon tilting of the vehicle, the rear wheel in the form of a ball engages the ground about a narrower portion of its perimeter facilitating steering into a turn. Similarly, the frusto-conical shaped wheels of FIG. 11E naturally assist in facilitating a turn when the vehicle is tilted to either side.

FIG. 11F shows a single cylindrical rear wheel of extended lateral dimension preferably wider than the front wheel axle which, particularly in conjunction with a rearwardly inclined steering pivot axis 40 (not shown), can act in a similar manner to laterally spaced rear wheels 32', facilitate steering into a turn. These various wheel configurations and laterally spaced rear wheels 32' may also be wider than the front wheel but preferably not so wide as to interfere with movement of the legs. Also preferably the rear wheel(s) 32, 32' is/are sufficiently wide to enable the rear wheel(s) 32, 32' to remain on the ground at the likely maximum angle of leaning $\theta$.

Referring now to FIGS. 12A and 12B a configurable steering mechanism in which the steering characteristics are dependent upon load is shown comprising a tiltable rear wheel steering pivot axis 40 here provided by a rear wheel mount 35 comprising a pivot pin 38 mounted on a rotatable engagement member 46 for rotation about a horizontal adjustment pivot 52 about horizontal adjustment pivot axis 42. Pivot 52 is mounted on frame extension 128 (as shown in FIG. 11A), but omitted from FIGS. 12A and 12B (for clarity). A resilient member, here in the form of a leaf spring 44 may be provided configured to return the tiltable rear wheel steering pivot axis 40 to an initial position (e.g. from a second position upon removal of a load). Here, leaf spring 44 interacts between rotatable engagement member 46 and frame 28 forcing engagement member 46 to rest against stop 48 until a predetermined load is applied. In an alternative embodiment, a torsion spring 44' wound around the pivoting axis 42 may be provided supported between the frame 28 and the rotatable engagement member 46. Various alternative kinds and arrangements of resilient member(s) may be provided to produce the desired effect as would be understood by someone skilled in the art, for example, resilient material such as rubber, foam may be used. To effect braking, a first tilting mechanism, such as a tiltable back rest, may be provided separately. Spring 44, 44' or equivalent, is typically relatively weak so that upon application of even a typical load by a user (e.g. when seated), it compresses until the rotatable engagement member 46 reaches a second stop at an end position such as an underneath surface of frame 28 (see FIG. 12B) or other end stop as appropriate, such that the steering mechanism now has a rear wheel steering pivot axis in a second inclined position, the axis being inclined to the rear having its top rearward of its base. Initially, before a load is applied, rear wheel steering pivot axis 40 is in a first initial position which is preferably vertical or substantially vertical but may be slightly rearwardly inclined. Typically, rear wheel mount 35 and, in particular, pivot pin 38 may be offset by a distance 's' from rear wheel axle 34. As shown in FIG. 12A, a vertical steering pivot axis 40 with an offset 's', provides a mechanical trail x1 between the projection of the steering pivot axis 40 on the ground and the contact patch 54 of rear wheel(s) 32'. In this instance, since steering pivot axis 40 is vertical, the castor angle is zero. It is preferred that the rear wheel steering pivot axis is vertical or substantially vertical, when the vehicle is stationary (e.g. when unloaded with the user standing), as this provides increased maneuverability. It is preferred that the rear wheel steering pivot axis is rearwardly inclined when the user adopts a seated (riding position) as this provides appropriate steering characteristics at speed.

Preferably, in FIGS. 12A and 12B a tiltable rear seat or tiltable back rest is used to provide a first tilting mechanism, the configurable steering mechanism being provided on the rear wheel in the form of a tilting rear wheel steering pivot axis 40, 40'.

In the embodiments of FIGS. 4 to 9D and FIGS. 12A and 12B, an additional mass 36, rearward of the contact patch of rear wheel 32 may be provided to enhance (FIGS. 4 to 9D) or further enhance (FIGS. 12A and 12B—in combination with a rearwardly inclined steering pivot axis 40) the ability to steer into a turn (e.g. by leaning). In FIGS. 12A and 12B, the configurable steering mechanism provides a small rearward tilt to a rear wheel steering pivot axis 40, 40' under a load (until a stop is reached). Whist this does in some sense contribute to the ability of a user to tilt rearwardly to counter forward momentum whilst braking, and so may be viewed as a second tilting mechanism, this is usually not enough to provide sufficient rearward tilt of a user to effect proper braking, the purpose being instead to facilitate the provision of a rearwardly inclined rear wheel steering pivot axis when a user applies load (e.g. sits down). When stationary and the load is removed, the steering axis preferably returns to a near vertical or vertical position facilitating turning on the spot.

Thus, upon application of a load applied by a user on seat 18, relatively weak resilient member, here spring 44, 44', is compressed until a stop is reached. The application of load results in engagement member 46 rotating about pivot 52 and tilting of steering pivot axis 40 through a negative caster angle β to the rear, to a new position rearwardly inclined to the vertical (with the top of the pivot axis to the rear of the bottom of the pivot axis) to provide a now rearwardly inclined or further rearwardly inclined steering pivot axis 40'. Taking the projection of the rearwardly inclined steering pivot axis 40' to the ground, the distance between the new contact patch location 54' and the projection on the ground is x2 which is typically larger than x1 decreasing the effort required to steer by leaning and ensuring the vehicle turns to the side that it is leaning, increasing its tendency to straighten up. Thus, under load, the adjustable steering mechanism comprising the tiltable rear wheel mount 35, here a rotatable engagement member 46 on pivot 52, now provides a negative castor angle β and with the top of the pivot axis 40 to the rear of the bottom of the pivot axis 40 an increased mechanical trail x2. This mechanism functions as a tiltable steering mechanism to enable a user to enhance mechanical trail and facilitating steering into a turn at high speeds.

Figure 15:
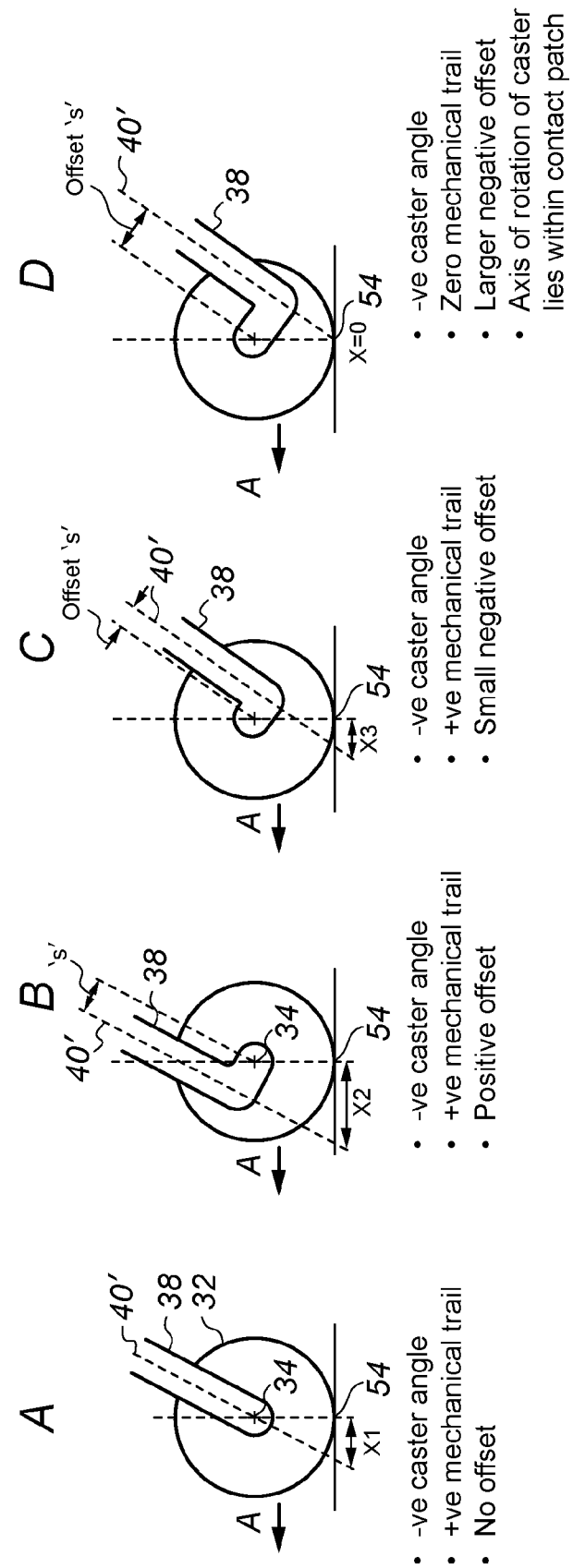
FIG. 15 shows various rear wheels with rearwardly inclined (lower to front of vehicle, higher to rear) rear wheel steering pivot axes and various levels of offset to give different mechanical trails (and steerability effects).
Figure 16:
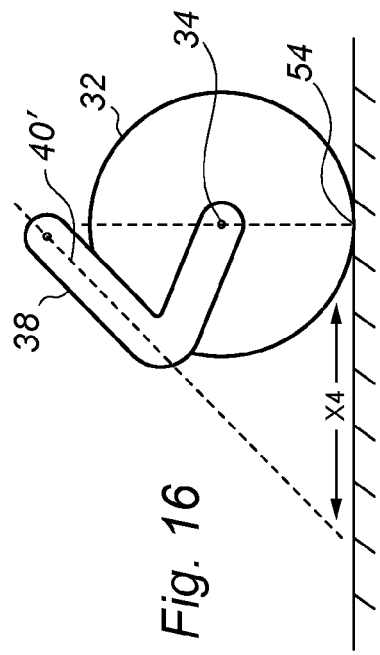
FIG. 16 shows a side elevation view of a rear wheel 32 and steering pivot pin 38 having a rearwardly inclined rear wheel steering pivot axis 40' in a preferred second tilted position in which the top of the steering pivot axis 40' lies vertically above or substantially vertically above wheel axle 34 and contact patch 54.

Furthermore, providing an inclined steering pivot axis 40', whether or not this is adjustable from a first position to a second position under load, can be advantageous in facilitating steering. This can be understood by reference, briefly, to FIG. 15 in which various embodiments of rearwardly inclined steering pivot axes 40' are shown. By rearwardly inclined it is meant that the top of the pivot axis lies rearwardly of the bottom of the pivot axis. In FIG. 15, various embodiments of a steering pivot pin 38 with rearwardly inclined steering pivot axes 40' are shown. Picture A shows a rearwardly inclined steering pivot pin introducing a negative castor angle and positive mechanical trail of x1 with no offset. Picture B shows a steering pivot pin 38 with a negative castor angle and a positive offset 's' providing an increased positive mechanical trail x2. This introduces stability at high speeds but is more difficult to turn at low speeds. Picture C shows a steering pivot pin 38 with a small negative offset 's' providing a reduced positive mechanical trail x3. Picture D shows an interesting embodiment in which a negative castor angle is offset by a larger negative offset position resulting in a zero mechanical trail (x=0) in which case the projection of the axis of rotation of the castor on the ground lies within the contact patch 54. This arrangement is less preferred as being potentially unstable leading to a negative mechanical trail which is difficult to control. A preferred arrangement for the second rearwardly inclined position of the rear wheel steering pivot axis 40' is shown in FIG. 16 in which the top of the pivot axis 40' here the top steering pivot pin 38 lies substantially vertically above the rear wheel axle 34 and substantially vertically above the contact patch 54. In this preferred second position of the rear wheel steering pivot axis 40', the vehicle is very sensitive to leaning of the vehicle to the side in order to steer, but very insensitive to rotation of the rear wheel about a vertical axis due to application of a torque from the front wheel and/or frame. This is because it is difficult to apply torque from the front wheel and/or frame to rotate the rear wheel 32 about a vertical axis to change the direction of steering of the vehicle as the top and bottom of the steering pivot pin and wheel axle and contact patch are in a vertical line but the steering pivot axis 40' of the rear wheel is not. Thus, whenever the steering pivot axis 40' is at a rearward inclined angle β to the vertical, it is difficult to change the direction of steering by applying torsion to the rear wheel (about a vertical axis) from the front wheel and/or frame of the vehicle. However, whenever the steering pivot axis 40' is at a rearward inclined angle β to the vertical, it is relatively easy to cause the rear wheel to turn about a vertical axis, by leaning of the front wheel to one side, thus causing the front wheel and frame to rotate about the rearwardly inclined steering pivot axis 40' with respect to the rear wheel 32, so causing the rear wheel to rotate about a vertical axis facilitating a turn. It will appreciated by those skilled in the art by consideration of the embodiments herein, that providing an adjustable castor angle and/or adjustable offset can facilitate the design of vehicles configured to have ease of rotation on the spot at zero or very low speeds and yet controlled steering into a turn at high speeds.

Thus, In the embodiment in FIGS. 12A and 12B, a first tilting mechanism to facilitate braking may be provided by a tiltable seat or back rest, or flexible frame or otherwise as understood by someone skilled in the art, rather than by forwardly tilting or lowering the rear wheel steering pivot axis as in the embodiment described in FIGS. 8, 9A, 9B, 9C, 9D. The tiltable rear wheel steering pivot axis 40 in FIGS. 12A and 12B here provides a steering mechanism. A preferred alternative to spring 44 shown in FIGS. 12A and 12B is a torsion spring 44' provided about axis 42. Thus, the steering mechanism provided by tiltable rear wheel steering pivot axis 40 may be resiliently mounted e.g. spring loaded.

Referring now to FIGS. 13A to 13C, the load on the vehicle is low being lightened by the user having both feet on the ground. This represents the situation in FIG. 12A in which a small or zero mechanical trail is provided facilitating ease of rotation on the spot or at low speeds. The right foot exerts a greater (rearward) force on the ground causing the vehicle to rotate anti-clockwise.

FIGS. 14A to 14C show the response of a vehicle, such as that seen in FIGS. 13A to 13C with a mechanism as shown in FIGS. 12A and 12B, in which the steering mechanism is loaded by most of the user's weight and the user wishes to turn at e.g. high speed. Here in this second position, as shown in FIG. 12B, the steering pivot axis 40' is now rearwardly inclined under load and a negative castor angle β is established. The rearwardly inclined steering pivot axis 40' facilitates self-stabilising steering when loaded (e.g. with a user seated) by enabling the vehicle to steer into a turn by leaning, and at the same time reducing the ability of the vehicle to steer by applying torsion to the rear wheel (about a vertical axis) from rotation of the front wheel and/or frame about a vertical axis. An added bonus in some embodiments is the increased mechanical trail that may be provided, so that both enhanced control of steering into a turn (by leaning) is provided in such a vehicle (due to the increase in inclination rearwardly of the steering pivot axis) and enhanced stability by also reducing the vehicle's sensitivity to steering by a torsion mechanism (applying torsion to the rear wheel (about a vertical axis) from rotation of the front wheel and/or frame about a vertical axis), e.g. during turning at speed, due to the increased mechanical trail. Thus, increased mechanical trail does not impact on the vehicle's ability to turn by leaning, but does impact on the ability to turn the rear wheel by imposing a torque about the contact patch of the rear wheel. The resiliently cooperating first and second positions of the rear wheel steering pivot axis (40, 40') assist in recovery from unstable positions with zero or negative mechanical trail by simply enabling a user to stand up returning the axis 40' to a first initial (preferably vertical or substantially vertical) position 40 by action of the resilient mechanism to return the rear wheel steering pivot axis to a first position and allowing a user to walk forward to re-establish positive mechanical trail.

FIGS. 17A, 17B, 18A, 18B and 18C show alternative embodiments each having a laterally rotatable backrest 122 that can rotate sideways laterally with respect to the plane of the vehicle (e.g. defined by a major plane of the frame 28 and front wheel 12). In FIG. 18B backrest 122 also rotates forwardly and rearwardly with respect to the vehicle, as described elsewhere. Preferably, where lateral rotation and forward/rearward rotation of the backrest are provided, the associated rotational mechanisms (and therefore rotational movements) are independent and orthogonal of each other.

Referring now to FIGS. 17A and 17B, the vehicle is shown in, respectively, an initial upright position in FIG. 17A with a laterally rotatable backrest 122 in-line (and here substantially vertical) with respect to the rest of the vehicle and in particular, with vehicle frame 28 and front wheel 12 (not shown). The vehicle is shown in a laterally inclined position in FIG. 17B in which laterally rotatable backrest 122 is inclined laterally to the side at an angle "α" with respect to frame 28 (and front wheel 12). Thus the backrest 122 is laterally rotatable with respect to the seat base 19 suspended above the front wheel, although the seat base itself may be resiliently or otherwise not rigidly mounted to frame 28 (e.g. provided with suspension) as is known in common general knowledge for use in bicycle seats to increase a riders comfort.

FIGS. 17A and 17B show a vehicle 30, 430 (which may alternatively be vehicles such as vehicles 130, 230 and/or 330 as described elsewhere). Vehicles 30, 430 comprise a frame 28, which comprises a seat post 16 for carrying seat 18 and a laterally rotatable backrest 122 rotatable laterally with respect to the rest of the vehicle, about a pivot 60. A person skilled in the art would understand that pivot 60 may be replaced by other rotating mechanisms allowing for suitable rotation of backrest 122, e.g. a pin and sleeve pivot or a hinge joint or a ball and socket joint and so on.

Whilst the seat base 19 cannot be seen in FIGS. 17A and 17B it will be understood by those skilled in the art that the backrest 122 is laterally inclinable by lateral rotation with respect to the seat base 19 so that a user can lean to his upper body to the side and in so doing control the overall position of his centre of mass with respect to the vehicle e.g. when turning the vehicle.

In FIG. 17B, a user is turning vehicle 30, 430 to the left and in doing so the user leans vehicle 30, 430 and his overall centre of mass to the left. A user's lower body remains astride seat base 19 (not shown) and a user can lean his upper body (and indeed his head) independently from his lower body to one side (e.g. here to the right so that the upper body is more upright (in this example). This is facilitated by laterally rotatable backrest 122 rotating laterally by, for example, an angle "α" about pivot 60 with respect to the seat base 19, seat post 16 and the rest of frame 28. Thus, a user can lean the vehicle and his lower body to one side and use his upper body (and/or head) to control the overall position of his centre of mass with respect to the vehicle, perhaps, as in this case, to counteract somewhat the effect of the lean of the lower body to one side. In this case, in FIG. 17B, the user leans his lower body inwards (with respect to the turning circle) and his upper body outwards when turning. It would be understood by a person skilled in the art, that a user can lean into the turn whilst rotating his upper body in the opposite direction and in doing so rotate the backrest 122 laterally to achieve a better positioning of his overall centre of mass. This ability to laterally rotate the laterally rotatable backrest 122 allows the user to have better control to start a turn of the vehicle 30, 430 by exaggerating the lean of the upper body (and/or head) to the side of the turn to begin with, then to maintain the turn of the vehicle by moving the upper body (and/or head) towards the centre to a more upright position. In FIG. 17B the overall centre of mass is still to the left of the frame but less so than at the start of the turn. This way a user has greater stability and can more easily steer and maintain fine control by using his upper body weight (and/or head) independently of the rest of the body to precisely position the overall centre of mass and hence precisely counter centrifugal type forces and/or the lean of the vehicle.

FIG. 18A shows one possible embodiment of seat 18 comprising seat base 19 and laterally rotatable backrest 122. Laterally rotatable backrest 122 is mounted on seat base 19 by pivot 60. A lower member 62 is attached to seat base 19, and extends rearwardly from it. An upper member 64 is attached to laterally rotatable backrest 122, and extends rearwardly from it. One or more resilient members may be provided to assist in causing laterally rotatable backrest 122 to return to an upright position from a laterally rotated position (e.g. approximately perpendicular to seat base 19), when not being acted upon by a user leaning to one side. For example one or more springs, such as helical springs, may be provided on each side of laterally rotatable backrest 122, one or more torsion springs may be provided wound about pivot 60 or other types of resilient members may be used. In this example a single elongate resilient elasticated member 66 (e.g. a bungee cord) is used. This elongate resilient member 66 is, arranged to provide a return force to the laterally rotatable backrest 122 from each side of the vehicle. It is attached to either side of lower member 62 and looped around an upper member 64. Resilient member 66 is preferably clamped or clipped to upper member 64 e.g. by clamp 70 just below upper member 64. Those skilled in the art would understand that resilient member 66 could be attached to upper member 64 in a number of different ways e.g. by fixedly attaching it at an upper point 68 or by relying on friction e.g. by wrapping resilient member 66 around upper member 64, to increase the frictional resistance and so on. Resilient member 66 is under tension preferably with each side portion of resilient member 66 under more or less equivalent tension. This tension acts to counteract the inherent instability of backrest 122 and tends to return it to its initial upright position when not being acted upon by a user leaning to one side. Preferably laterally rotatable back rest 122 only rotates laterally to the side about pivot 60 although embodiments can be envisaged in which a multi-directional pivot (e.g. a ball and socket joint, universal joint) to also facilitate front/rear rotation of seat back 122 can be envisaged although this is less preferred. Preferably, a separate independent orthogonal pivot may be provided to facilitate front/rear rotation of seat back 122 as will be shown in FIG. 18B.

FIG. 18A shows a vehicle which operates on a similar principle to that shown in FIGS. 17A and 17B. When a user turns vehicle 30, 430 in either direction he or she will tend to lean vehicle 30, 430 in the direction of travel. A user can lean his upper body (and/or head) to one side to have better control in starting, maintaining, or returning the leaning of the vehicle 30, 430 and through it to have better control of the steering. This is facilitated by laterally rotatable backrest 122 rotating laterally about pivot 60 with respect to seat base 19 and frame 28 to allow independent movement of the upper body with respect to the rest of the body and the vehicle 30, 430. It would be understood by a person skilled in the art, that a user may lean into the turn or out from the turn rotating laterally rotatable backrest 122 into or out from the turn respectively. Resilient member 66 will act to counteract a user's upper body lean to either side and will aid in returning the laterally rotatable backrest 122 to its initial upright position (e.g. when not acted upon by a user).

FIG. 18B shows two independent pivots 60, 80 orthogonal to each other. One pivot 80 allows forward/backward movement and is positioned at around waist height or just below. Another pivot 60, provided to allow lateral rotation, is positioned, in this example, around the middle of the backrest 122. FIG. 18B shows another example embodiment of laterally rotatable backrest 122 with pivot 60 similar to that shown in FIG. 18A. In this example embodiment laterally rotatable backrest 122 comprises an upper portion 122A, a lower potion 122B and a pivot 60, which joins the two portions of laterally rotatable backrest 122 so that upper portion 122A can rotate laterally with respect to lower portion 122B about pivot 60. Lower portion 122B may be attached to seat base 19 by pivot 80 which allows movement of the laterally rotatable backrest 122 forwardly and rearwardly with respect to the vehicle. A lower member 162 is attached to lower portion 122B, and extends rearwardly from it. An upper member 64 is attached to upper portion 122A and extends rearwardly from it. An elongate resilient member 66 is provided attached to either side of lower member 162 and looped around an upper member 64. As described in FIG. 18A resilient member 66 is preferably attached (e.g. by one of the means described previously herein such as one or more springs and so on such as helical or torsion springs) to upper member 64 to hold resilient member 66 in place. Resilient member 66 is under tension preferably with each side portion of resilient member 66 under more or less equivalent tension. This tension acts to counteract the inherent instability of upper portion 122A and tends to return it to its initial upright position when not being acted upon by a user leaning to one side. In this example embodiment backrest 122 can additionally be rotated forwards and rearwards about pivot 80 to lie along and in line with seat base 19, so backrest 122 is folded away.

FIG. 18C is another example embodiment of laterally rotatable backrest 122, similar to that shown in FIGS. 18A and 18B, in which a lower member 262 is provided attached to lower portion 122B of laterally rotatable backrest 122. Laterally rotatable backrest 122 is shown in its initial upright position (solid line) here in-line with the rest of the vehicle and in particular with seat base 19 and frame 28. It is also shown in its laterally inclined position (broken lines), in which backrest 122 is inclined at an angle "α" about pivot 60 with respect to seat base 19 and frame 28. A torsion spring may be provided in seat base 19 and backrest 122 about pivot 60. Alternatively, or in addition, there may be provided a hole or through-bore 164 which passes through the upper portion 122A of backrest 122 laterally to the plane of the vehicle. Lower member 262 typically extends laterally, sideways to the plane of the vehicle. Indeed two separate lower members 262 may be provided each extending to one side of laterally rotatable backrest 122. Hole or through-bore 164, typically passes through backrest 122 and lies substantially above lower member 262. One end of elongate resilient member 66 is attached to lower member 262 on one side and threaded through hole or through-bore 164 such that the other end of resilient member 66 is attached to lower member 262 on the other side. Typically each half of resilient member 66 will have the same or similar tension in it. Resilient member 66 is preferably clamped or otherwise fixed to the upper portion 122A of the laterally rotatable backrest 122 in the region of hole or through-bore 164.

FIGS. 18B and 18C operate on a similar principle to each other. When a user turns vehicle 30, 430 in either direction he or she will tend to lean vehicle 30, 430 into the direction of travel. A user can lean his upper body to one side, in conjunction with leaning the vehicle 30, 430. This is facilitated by upper portion 122A of laterally rotatable backrest 122 rotating laterally about pivot 60. Resilient member 66 will act to counteract a user's upper body lean to either side and will aid in returning the upper portion 122A to its initial upright position In FIGS. 18A, 18B and 18C, resilient member 66 acts to counteract the inherent instability of backrest 122 (FIG. 18A) or upper portion 122A of backrest 122 (FIGS. 18B and 18C) and tends to return it to its initial upright position when not being acted upon by a user leaning to one side.

It would be understood by those skilled in the art that alternatives to a single resilient member 66 may be used, such as two or more individual resilient members, each acting in opposition to one another to pull laterally rotatable backrest 122 upright from opposing sides of vehicle 30, 430. Thus, resilient member 66 may be replaced by any suitable resilient mechanism exerting force on the laterally rotatable backrest 122 to return it to its upright position, e.g. one or more bungee cords, one or more rubber bands, one of more springs etc. For example resilient member 66 may comprise two individual springs one on each side of backrest 122 and may be provided between lower members 62, 162, 262 and upper member 64 or hole or through-bore 164. Indeed other methods of attaching resilient member 66 such as springs between the frame and the seat base 19 and laterally rotatable backrest 122 can be envisaged. It would also be understood that lower members 62, 162, 262 and upper member 64 may be platforms, spigots, eye bolts or any other protrusion or mechanism capable of attaching resilient member 66 or alternative resilient mechanism.

It will be understood by those skilled in the art that a laterally rotatable backrest as described herein is a clearly defined alternative embodiment, to a non-laterally rotatable backrest.

In various embodiments the invention provides a non-steerable, free-wheeling front wheel which is non-steerable with respect to the frame 28 and the seat 18. The vehicle is free of obstructions to the front of a user enabling a user to dismount forwardly either by choice or in the event of the vehicle stopping suddenly for some reason.

In various embodiments, a backrest is provided as a means to counterbalance the forward torque induced when moving forwards by the action of a user's feet on the ground.

Preferably, during normal walking or running whilst seated on the vehicle, the majority of the user's weight is on the front wheel to allow the front wheel to take advantage of the larger front wheel's lower rolling resistance. The seat post may be adjustable to cater for different user's heights. Typically, the seat post and seat are arranged so that the seat is positioned at a distance from the front wheel axle larger than the diameter of the front wheel so that the seat may rotate freely about the wheel and, indeed, so that the front wheel may rotate freely underneath the seat. In various embodiments, a rearward tilt of the frame suspending the seat on the front wheel axle towards rear wheel axle facilitates a comfortable riding position for a user, reducing the likelihood of the seat tilting forwards.

In various embodiments, the rear wheel and/or the backrest are tiltable to facilitate a user leaning back to counteract his or her forward motion upon wishing to brake the vehicle, either by action of their feet and/or by action of a brake mechanism. Further, this assists in redistributing the weight of the user to the rear wheel during slowing or braking by feet and/or by a brake mechanism, if provided.

In various embodiments one or more steering mechanisms may be provided that facilitate steering into a turn and in various embodiments these change (preferably reducing) their sensitivity to steering with speed and/or load. Two ways of steering are described firstly, rotation about the rear steering pivot axis 40 by rotating the big wheel with respect to the little wheel and rotation about the axis 40 by tilting of the vehicle (the pivot axis 40 becoming further rearwardly inclined). For example, the addition of a rearwardly inclined steering axis 40/40' associated with one or more rear wheels provides that leaning (rolling) of the front wheel (rotation about a horizontal component of the inclined steering axis) produces yaw of the rear wheel (rotation about a vertical component of the steering axis) facilitating turning. At low speeds and whilst stationary it is preferred to effect steering by rotation of the front wheel with respect to the rear wheel (so it is preferred to have axis 40 vertical—see FIGS. 13A to 13C). At high speeds, it is preferred to effect steering by leaning, so a rearwardly inclined rear wheel steering pivot axis 40' is preferred. In various embodiments the rear wheel steering pivot axis is rotatable about a horizontal axis so as to vary its angle of inclination during use, e.g. upon application of a load by a user preferably from a first vertical or substantially vertical position to a second rearwardly inclined steering pivot axis position. Preferably this change in position occurs as soon as a user sits on the seat. In various embodiments a steering mechanism is provided which facilitates a lower mechanical trail when turning at low speeds and an increased mechanical trail when turning at high speeds thus making it more stable when turning at high speeds. A positive mechanical trail is desirable, particularly at higher speeds, as this facilitates stable motion. Damping may be provided to reduce any unwanted oscillation of the rear wheel. A steering mechanism may incorporate an additional mass, rearward of the contact patch of the rear wheel, facilitating steering at low speed by the action of the weight of the mass causing the rear wheel to steer into the turn whilst, at higher speeds, the weight of the additional mass is offset by centrifugal forces reducing the effect and providing negative feedback so that to effect an equivalent turn, a higher level of tilting is required at higher speeds.

In a desirable embodiment for an inexperienced user, the combination of the backrest, rear wheel and slight tilt of the frame so that the user's weight is not directly over the front wheel axle enables a user's weight to be balanced predominantly on the front wheel with reduced risk of inadvertently tilting forwards. The vehicle of the invention allows stable sitting while moving and handling of forces such that it can be propelled and stopped by naturally walking running and stopping the body. The angular momentum of the big wheel gives it stability as it moves but mainly the stability comes from the vehicle turning to the side it is leaning towards. It can be steered by asymmetric traction of each foot (at low speed) or by tilting the front wheel at high speed. As the vehicle does not typically have pedals, to facilitate walking or running, the functions of propulsion and braking, that in traditional unicycles are performed with the pedals, are performed differently.

The vehicle of the invention can be viewed as an aid to walking or running consisting in a large wheel carrying most of the load of a user's body weight, stabilised backwards by the use of a small castor rear wheel. Propulsion is provided by the feet against the ground and aided by a backrest and the small backwards lean of the main loading beam. The vehicle stops by a user applying a rearward force on the seat or backrest and/or application of a caliper brake that closes as the user's body leans backwards overcoming the force of a preloaded spring. Steering is performed at low speeds by different traction of the two feet and while driving or coasting at higher speeds by the user's body as it tilts sideways in the direction of the curve. Steering at higher speeds is performed by conservation of angular momentum of the front wheel but mainly by use of a steering mechanism such as a rearwardly inclined rear wheel steering axis and/or by gravitational pull of a rear wheel (castor) centre of mass to rotate the rear castor wheel in the required steering direction (opposite to the direction of turn of the front wheel). In embodiments of the present invention, the geometry and construction of the vehicle itself facilities steering of the vehicle to the side it is leaning.

The present invention offers a vehicle that acts, at least in part, as an extension of the human body to aid the user to walk or run in a more efficient way, allowing him or her to cover longer distances at faster speeds and with less effort for the same distance. An important feature of the present invention is that to operate it, it only requires that the user walk or run naturally, making it very easy to learn to ride and very efficient in using the human body as a source of power. This is in contrast to previous vehicles which may be similar to traditional scooters requiring a user to propel the vehicle using one leg only, having to remain standing and having to bend the opposite knee for every push of the ground. To be able to sit on the vehicle of the present invention and reproduce the movements of walking or running is a great advantage for the interface between the human body and a vehicle for human transportation. In addition, the high degree of control due to the close and natural man-machine interface (user interface) of the vehicle of the present invention, and its stable operation even whilst standing allows the use of the machine in situations that might be impossible for other vehicles. Specifically, when moving through a crowded environment the user has to move at low speed and with a high degree of control and the present invention has particular utility to achieve this which is advantageous in urban environments on urban transportation systems.

Another of the main characteristics of this vehicle that it is easy to carry and load into other vehicles so that it can be combined with other forms of transport, such as cars, trains or buses. Further, the vehicle is practically maintenance free so the user knows that it is always ready to be used.

A lot of complexity is avoided by way of propelling the vehicle of the invention using the legs directly on the ground to push the body and vehicle. In addition, the vehicle is further simplified as it does not require handlebars to control steering. Further, its portability is a great improvement whilst its overall dimensions and weight are reduced, for example, in comparison to a bicycle. The vehicle of the present invention improves the safety of the user while operating the vehicle avoiding the dangerous situation of a user's legs being trapped between the pedals and handlebars propelling a users head towards the ground in the event of an obstruction stopping the vehicle suddenly. The user can easily jump out of the vehicle in a forward direction and the present invention solves the problems of how to propel, steer, stabilise and brake the vehicle without handlebars, steerable front wheel and pedals. The use of a large wheel on the front of the vehicle is very convenient as the larger the wheel is more tolerant to variation in the road surface, allowing a smoother ride. Further, as the larger wheel rotates relatively slower, losses to friction during motion are reduced (lower rolling resistance).

For these reasons the present design is based on the use of a large wheel, with a diameter of the same order or a bit smaller than the length of the legs, to carry most of the user's body weight and new technical solutions as described herein to the problems of propelling, steering, stabilising and stopping the vehicle and user.

In summary, the invention alleviates the technical problems of: propelling, steering, stablising and stopping a vehicle yet providing a vehicle with very low rolling resistance, very simple to use, compact in size and of low weight. This is achieved by providing a vehicle that allows loading of most of a user's weight on a large diameter front wheel and the use of an interface between the human body and the vehicle based on the natural movements of walking and running enabling use of a self-propelled vehicle by both fit, healthy individuals and less fit individuals.

The invention claimed is:

1. A vehicle for aiding a person to walk or run and drivable in use by a person walking or running by using one foot then the other on respective sides of the vehicle whilst supported on a seat comprising:
   a frame;
   a large diameter front wheel, free-wheeling and non-steerable with respect to the frame;
   a seat for supporting a user's weight;
   the frame being configured to carry the seat suspended on the front wheel axle above the front wheel in the manner of an inverted pendulum;
   a steering mechanism comprising a small diameter, steerable rear wheel journaled to the frame at a rear wheel steering pivot axis and wherein the rear wheel steering pivot axis configurable in at least a first position and a second position, wherein in the second position, it is inclined rearwardly so that an upper portion of the pivot axis lies rearward of a lower portion of the pivot axis when the vehicle is viewed from the side during use;
   the seat being freely rotatable from its position above the front wheel forwardly in use with respect to the front wheel;
   the seat comprising a seat base for supporting a user;
   the seat further comprising a backrest configured to prevent the seat rotating forwardly from its position above the front wheel during use.

2. A vehicle according to claim 1 comprising a first tilting mechanism configured to enable a user to tilt rearwardly with respect to the frame to assist in braking the vehicle in use by action of a user's feet on the ground and/or by leaning of a user's body rearwardly to counter forward momentum.

3. A vehicle according to claim 2 in which the first tilting mechanism comprises the frame and rear wheel configured so as to be tiltable with respect to one another under load to enable a user to tilt rearwardly with respect to the frame, and in which the first tilting mechanism is tiltable so as to increase the angle between the vertical and a first line of action of a user's weight acting on the seat base from the seat base to the front wheel axle and/or between a first line of action of a user's weight acting on the seat base from the seat base to the front wheel axle and a second line of action of a user's weight acting on the seat base from the seat base to the rear wheel axle.

4. A vehicle according to claim 2 in which the first tilting mechanism comprises the backrest being tiltable rearwardly with respect to the frame and/or the seat base being tiltable rearwardly with respect to the frame.

5. A vehicle according to claim 1 in which the frame comprises a seat post supporting the seat, and the frame is arranged to carry the seat on the front wheel so that the position of the seat post with respect to a vertical through the front wheel axle is at an angle selected from the group of: <15°, <10°, <5°, 0.5° to 15°, 0.5° to 10°, 0.5° to 5°, 1° to 15°, 1° to 10°, 1° to 5°, 3° to 12°, and 5° to 10° to the vertical during use.

6. A vehicle according to claim 1 in which the steering mechanism further comprises the rear wheel contacting the ground at a contact patch and a rear assembly comprising the rear wheel having a mass distribution so that the center of mass of the rear wheel assembly is rearward of the rear wheel contact patch with the ground.

7. A vehicle according to claim 6 in which the rear wheel assembly comprises an additional mass located rearward of the rear wheel contact patch with the ground.

8. A vehicle according to claim 1, wherein the rear wheel steering pivot axis is tiltable from the first position to the second position.

9. A vehicle according to claim 1 in which the rear wheel steering pivot axis is vertical or substantially vertical in the first position, or in which the rear wheel steering pivot axis is inclined rearwardly in the first position and is inclined further rearwardly when tilted in the second position.

10. A vehicle according to claim 1 in which the projection of the rear wheel steering pivot axis on the ground falls within a contact patch of the rear wheel on the ground when the rear wheel steering pivot axis is in the first position and/or in which the projection of the steering pivot axis on the ground falls forwardly of the contact patch of the rear wheel on the ground when the rear wheel steering pivot axis is in the second position.

11. A vehicle according to claim 1 in which the rear wheel steering pivot axis of the rear wheel is tiltable from the first position to the second position when a load is applied by a user placing his weight on the seat base.

12. A vehicle according to claim 11 in which the rear wheel steering pivot axis is provided with an offset with respect to the rear wheel axis, and the rear wheel steering pivot axis, rear wheel and offset are configured such that when the rear wheel pivot axis is tilted rearwardly to the second position, an upper portion of the rearwardly inclined rear wheel steering pivot axis is substantially vertically above the rear wheel axle and the contact patch of the rear wheel with the ground.

13. A vehicle according to claim 1 in which the steering mechanism is configured to provide an increase in mechanical trail of the rear wheel at higher speeds and/or when tilted and/or when under load.

14. A vehicle according to claim 1 comprising a braking mechanism comprising a brake caliper connected to the backrest, wherein the backrest is tiltable to actuate the brake caliper.

15. A vehicle according to claim 1 having two or more laterally spaced rear wheels with a common horizontal wheel axle, or a rear wheel having a lateral wheel width and associated rear wheel axle width greater than corresponding widths of the front wheel and/or front wheel axle.

16. A method for using a vehicle, in which the vehicle comprises:
 a frame;
 a large diameter front wheel, free-wheeling and non-steerable with respect to the frame;
 a seat for supporting a user's weight;
 the frame being configured to carry the seat suspended on the front wheel axle above the front wheel in the manner of an inverted pendulum;
 a steering mechanism comprising a small diameter, steerable rear wheel journaled to the frame at a rear wheel steering pivot axis and wherein the rear wheel steering pivot axis configurable in at least a first position and a second position, wherein in the second position, it is inclined rearwardly so that an upper portion of the pivot axis lies rearward of a lower portion of the pivot axis when the vehicle is viewed from the side during use;
 the seat being freely rotatable from its position above the front wheel forwardly in use with respect to the front wheel;
 the seat comprising a seat base for supporting a user;
 the seat further comprising a backrest configured to prevent the seat rotating forwardly from its position above the front wheel during use, and
 wherein said method comprises:
 supporting a user's weight on the seat;
 preventing the seat rotating forwardly by the user applying a pressure rearwardly on the backrest;
 driving the vehicle by walking or running by the user using one foot then the other on respective sides of the vehicle to propel the vehicle.

17. A vehicle according to claim 1, wherein the backrest is a substantially vertical backrest.

18. A vehicle according to claim 1 comprising a braking mechanism comprising a brake caliper and a rear wheel resiliently tiltable with respect to the frame, said rear wheel connected to the brake caliper to actuate the brake caliper.

* * * * *